US012783944B2

(12) United States Patent
Kozuka et al.

(10) Patent No.: US 12,783,944 B2
(45) Date of Patent: Nov. 3, 2026

(54) AUTOMATED MACHINE LEARNING SYSTEM, AUTOMATED MACHINE LEARNING METHOD, AND STORAGE MEDIUM

(71) Applicants: Kabushiki Kaisha Toshiba, Tokyo (JP); Toshiba Digital Solutions Corporation, Kawasaki Kanagawa (JP)

(72) Inventors: Takahiro Kozuka, Tokyo (JP); Toshiyuki Katou, Yokohama Kanagawa (JP); Ryo Kiyama, Chigasaki Kanagawa (JP)

(73) Assignee: Kabushiki Kaisha Toshiba, Kawasaki Kanagawa (JP)

( * ) Notice: Subject to any disclaimer, the term of this patent is extended or adjusted under 35 U.S.C. 154(b) by 842 days.

(21) Appl. No.: 18/177,377

(22) Filed: Mar. 2, 2023

(65) Prior Publication Data

US 2024/0028956 A1 Jan. 25, 2024

(30) Foreign Application Priority Data

Jul. 25, 2022 (JP) ................................ 2022-118193

(51) Int. Cl.
*G06N 20/00* (2019.01)

(52) U.S. Cl.
CPC .................................... *G06N 20/00* (2019.01)

(58) Field of Classification Search
CPC ... G06V 10/7792; G06V 10/776; G06N 20/00
See application file for complete search history.

(56) References Cited

U.S. PATENT DOCUMENTS

2015/0339572 A1 11/2015 Achin et al.
2016/0358099 A1 12/2016 Sturlaugson et al.
(Continued)

FOREIGN PATENT DOCUMENTS

JP 2017-4509 A 1/2017
JP 6444494 B2 12/2018
(Continued)

OTHER PUBLICATIONS

Hashmani, Manzoor Ahmed, et al. "Accuracy performance degradation in image classification models due to concept drift." International Journal of Advanced Computer Science and Applications 10.5 (2019): 422-425. (Year: 2019).*
(Continued)

*Primary Examiner* — Vincent Gonzales
*Assistant Examiner* — Pedro J Morales
(74) *Attorney, Agent, or Firm* — Finnegan, Henderson, Farabow, Garrett & Dunner, LLP

(57) ABSTRACT

According to an embodiment, an automated machine learning system includes a registration receiver, a verification dataset storage, a verifier, a feedback information generator, a first display controller, and an algorithm storage. The registration receiver is configured to receive registration of a machine learning algorithm. The verification dataset storage stores a verification dataset for use in operation verification on the machine learning algorithm. The verifier is configured to perform the operation verification by executing the machine learning algorithm using the verification dataset stored in the verification dataset storage. The feedback information generator is configured to generate feedback information on the bases of a result of the operation verification. The first display controller is configured to control display of the generated feedback information. The algorithm storage stores the machine learning algorithm for
(Continued)

which the result of the operation verification satisfies a specific criterion.

20 Claims, 10 Drawing Sheets

(56) References Cited

U.S. PATENT DOCUMENTS

| | | | | |
|---|---|---|---|---|
| 2020/0089885 | A1* | 3/2020 | Kling | G06F 21/566 |
| 2021/0019665 | A1* | 1/2021 | Gur | G06N 20/20 |
| 2022/0067541 | A1* | 3/2022 | Blanchard | G06N 5/045 |
| 2022/0129250 | A1* | 4/2022 | Yoo | G06N 3/08 |
| 2022/0147829 | A1 | 5/2022 | Kubota | |
| 2022/0180209 | A1* | 6/2022 | Xu | G06N 3/088 |
| 2023/0252347 | A1* | 8/2023 | Koulierakis | G03F 7/705 706/10 |
| 2023/0419643 | A1* | 12/2023 | Li | G06N 3/084 |

FOREIGN PATENT DOCUMENTS

| | | | |
|---|---|---|---|
| JP | 2019-3603 | A1 | 1/2019 |
| JP | 2020-52514 | A1 | 4/2020 |
| JP | 6860602 | B2 | 4/2021 |
| JP | 2021-124805 | A1 | 8/2021 |
| JP | 2021-177266 | A | 11/2021 |

OTHER PUBLICATIONS

Zhu, Hongyu, et al. "Tbd: Benchmarking and analyzing deep neural network training." arXiv preprint arXiv:1803.06905 (2018). (Year : 2018).*

Dominik Kreuzberger et al., "Machine Learning Operations (MLOps): Overview, Definition, and Architecture," arXiv:205.02302, 14 pages (2022).

Japan Patent Office, Office Action in JP App. No. 2022-118193 (Jan. 6, 2026).

Dominik Kreuzberger et al., "Machine Learning Operations (MLOps): Overview, Definition, and Architecture," arXiv:2205.02302, 14 pages (2022).

* cited by examiner

VD

| No | DATA FORMAT |
|---|---|
| DATA 1 (STANDARD FORMAT) | 224x224[px], jpeg, RGB IMAGE |
| DATA 2 (EXTENDED FORMAT 1) | 224x224[px], TIFF, RGB IMAGE |
| DATA 3 (EXTENDED FORMAT 2) | IMAGE HAVING UNEVEN SIZE, jpeg, RGB IMAGE |
| . . . | . . . |

FIG. 11

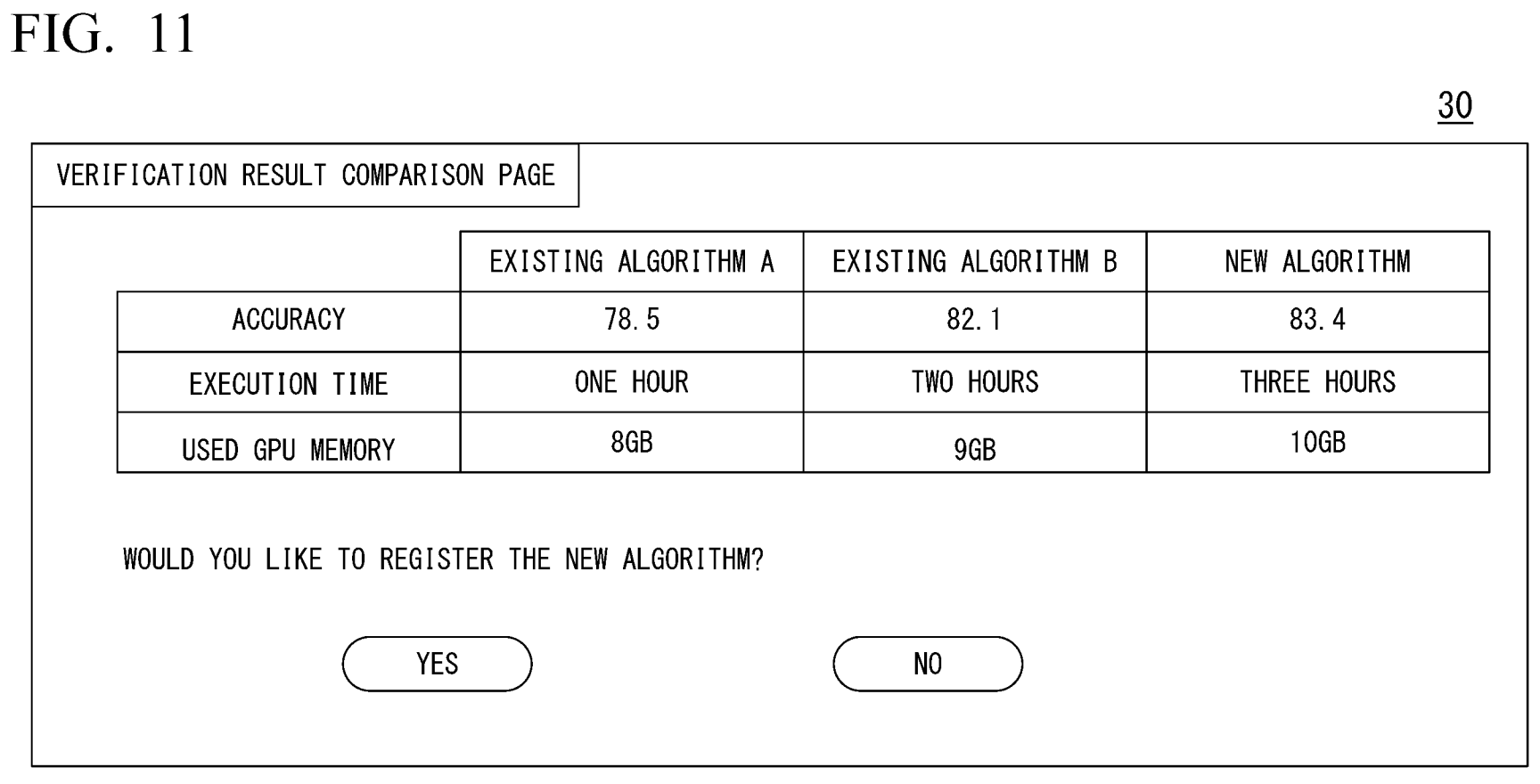

30

VERIFICATION RESULT COMPARISON PAGE

| | EXISTING ALGORITHM A | EXISTING ALGORITHM B | NEW ALGORITHM |
|---|---|---|---|
| ACCURACY | 78.5 | 82.1 | 83.4 |
| EXECUTION TIME | ONE HOUR | TWO HOURS | THREE HOURS |
| USED GPU MEMORY | 8GB | 9GB | 10GB |

WOULD YOU LIKE TO REGISTER THE NEW ALGORITHM?

YES NO

AUTOMATED MACHINE LEARNING SYSTEM, AUTOMATED MACHINE LEARNING METHOD, AND STORAGE MEDIUM

CROSS-REFERENCE TO RELATED APPLICATION

This application is based upon and claims the benefit of priority from Japanese Patent Application No. 2022-118193, filed Jul. 25, 2022; the entire contents of which are incorporated herein by reference.

FIELD

Embodiments of the present invention relate to an automated machine learning system, an automated machine learning method, and a storage medium.

BACKGROUND

The development of machine learning (artificial intelligence (AI)) technology enables the development of AI capable of advanced inference, such as image recognition, sentence summarization, and speech recognition. In the field of AI, an algorithm for describing input data is called an AI model (or simply a model) and a process of updating the model according to the input data is called machine learning (or simply training). Machine learning is roughly divided into supervised learning, unsupervised learning, and reinforcement learning in accordance with characteristics of the problem. In particular, in the supervised learning, the model is updated so that the model outputs a more desirable inference result for the input data.

Models include various methods of describing neural networks, support vector machines, decision trees, and the like. Within the models called neural networks, there are various description methods of an autoencoder, convolutional neural networks (CNN), recurrent neural networks (RNN), and the like. Also, for each model, there are various algorithms that train the model. Examples of algorithms include stochastic gradient descent, a genetic algorithm, an expectation-maximization (EM) algorithm, and the like, and they may be combined.

The absence of a universal algorithm that is optimal for all problems targeted by AI is known as the no-free lunch theorem. That is, those who want to develop valuable models need to select an appropriate algorithm for each problem targeted by AI. Accordingly, developing AI models requires experts with advanced knowledge and implementation skills. Furthermore, when an algorithm is executed, externally given settings called hyperparameters are necessary in general, and even if the same algorithm is used, the accuracy of the model after training can vary greatly due to differences in hyperparameters. Hyperparameters need to be explored by trial and error, even for AI experts, and time costs are required to develop AI models. Accordingly, those who try to use AI for real-world problems are forced to pay high costs in at least two points: requiring experts to develop models and requiring time costs, and hence the installation of AI is hindered as a result.

In relation to the above problems, the concept of automated machine learning (AutoML) has been proposed as an attempt to reduce costs by automating model development. AutoML aims to reduce the cost of relying on AI experts and trial and error as much as possible and technological development for automating trial and error of the above hyperparameters and comparative evaluation of multiple models is becoming active. As a result of technological development, people who do not have specialized knowledge of AI can create models with simple operations. For example, a method of automatically selecting a desirable model by creating a plurality of models using various algorithms and comparing their suitability has been proposed.

The AutoML system provides an optimal model by executing a plurality of pre-registered algorithms on the basis of execution instructions from the user and further performing each hyperparameter search. The algorithms to be executed are being developed one after another by algorithm developers with the development of machine learning theory and the latest algorithms are required to be quickly available in AutoML systems. Also, the algorithm may be customized in accordance with the issues and requests of those who intend to utilize the AI model and the customized algorithm is required to be added to the AutoML system.

However, an integrated mechanism for additionally registering new algorithms in the AutoML system has not been sufficiently studied. In order to execute various algorithms in a common environment, it is necessary to ascertain the parameters given externally during execution, conditions required for execution, and resources, and integrally manage them. Also, in accordance with the characteristics of the algorithm, specific preprocessing may be used in combination, and it is necessary to ascertain the necessary preprocessing. When an algorithm is added to the AutoML system, algorithm developers sometimes do not know exactly what conditions are required for execution and detailed verification and program corrections are time-consuming. In other words, the lack of a mechanism to automate verification and integrally manage the results prevents algorithm developers from adding various algorithms to the AutoML system.

BRIEF DESCRIPTION OF DRAWINGS

FIG. 11 is a diagram showing an example of a verification result comparison page according to a fifth embodiment.

DETAILED DESCRIPTION

Hereinafter, an automated machine learning system, an automated machine learning method, and a storage medium of embodiments will be described with reference to the drawings.

The automated machine learning system of the embodiment is an integrated management environment for integrally managing machine learning algorithms. In the following description, an example in which the automated machine learning system is implemented by a machine learning algorithm integrated management device and a machine learning device will be described. However, the automated machine learning system may be implemented by a single device or may be implemented by three or more devices. Also, each function of one of the machine learning algorithm integrated management device and the machine learning device may be provided in the other device. Some of the functions of the machine learning algorithm integrated management device and the machine learning device may be integrated. That is, the machine learning algorithm integrated management device, the machine learning device, and a combination thereof are examples of the "automated machine learning system."

According to an embodiment, an automated machine learning system includes a registration receiver, a verification dataset storage, a verifier, a feedback information generator, a first display controller, and an algorithm storage. The registration receiver is configured to receive registration of a machine learning algorithm. The verification dataset storage stores a verification dataset for use in operation verification on the machine learning algorithm. The verifier is configured to perform the operation verification by executing the machine learning algorithm using the verification dataset stored in the verification dataset storage. The feedback information generator is configured to generate feedback information on the bases of a result of the operation verification. The first display controller is configured to control display of the generated feedback information. The algorithm storage stores the machine learning algorithm for which the result of the operation verification satisfies a specific criterion. Thereby, it is possible to facilitate additional registration and management of a new machine learning algorithm in a system that integrally manages and executes machine learning algorithms.

First Embodiment

[Overall Configuration]

Figure 1:
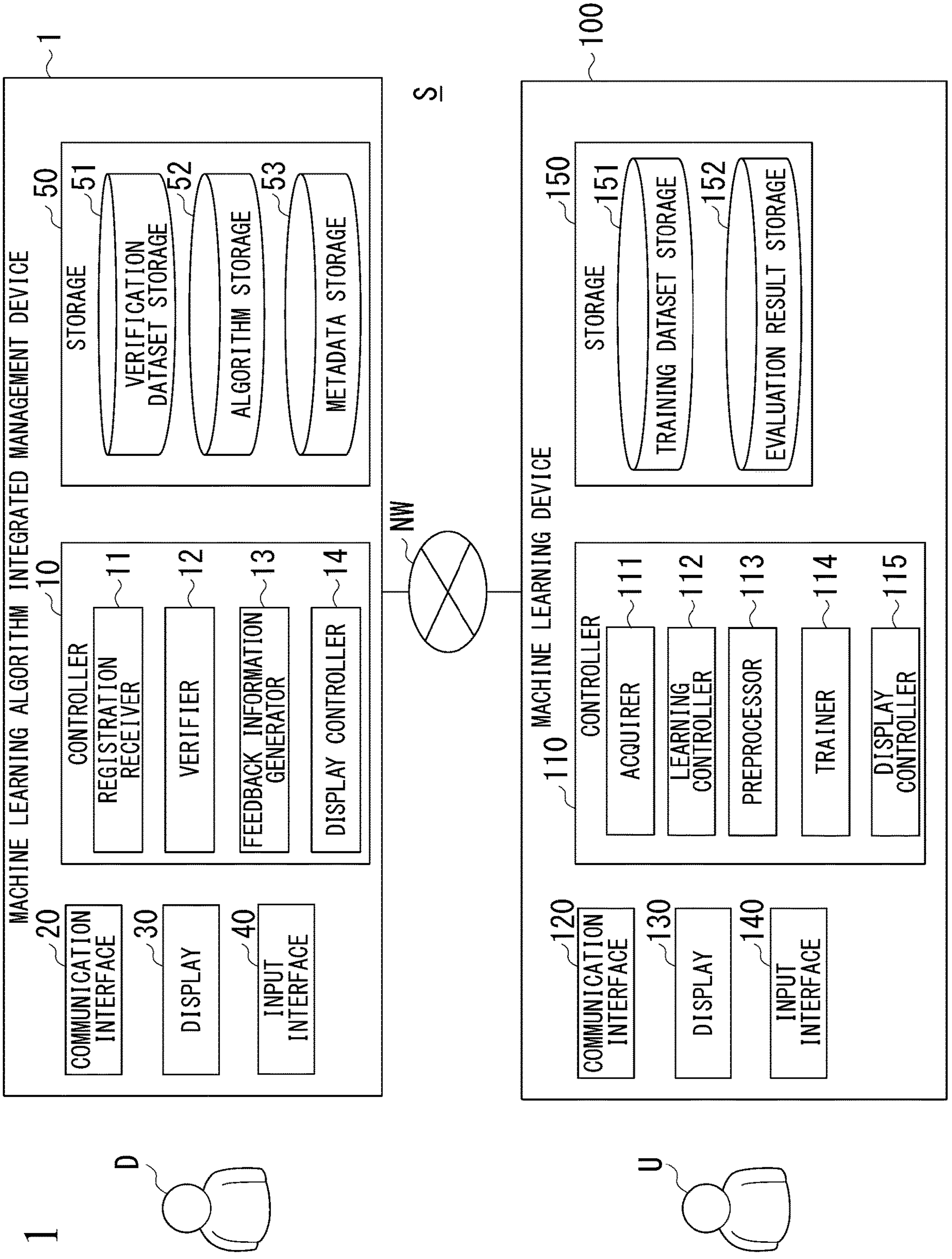
FIG. 1 is a functional block diagram showing an example of a functional configuration of an automated machine learning system S according to a first embodiment.

FIG. 1 is a functional block diagram showing an example of a functional configuration of an automated machine learning system S according to a first embodiment. The automated machine learning system S includes, for example, a machine learning algorithm integrated management device 1 and a machine learning device 100. The machine learning algorithm integrated management device 1 and the machine learning device 100 are communicatively connected via the communication network NW. The communication network NW includes, for example, the Internet, a wide area network (WAN), a local area network (LAN), a provider device, a radio base station, and the like.

The machine learning algorithm integrated management device 1 automatically verifies and confirms that the minimum specifications are satisfied when a new machine learning algorithm is registered. The machine learning algorithm integrated management device 1 is operated, for example, by an algorithm developer D (hereinafter referred to as a "developer D") who develops a machine learning algorithm. The machine learning device 100 performs a training process using a machine learning algorithm on which operation verification by the machine learning algorithm integrated management device 1 has been completed and generates a desired trained model. The machine learning device 100 is operated, for example, by an application user U (hereinafter referred to as a "user U") who uses a model.

[Machine Learning Algorithm Integrated Management Device]

The machine learning algorithm integrated management device 1 includes, for example, a controller 10, a communication interface 20, a display 30, an input interface 40, and a storage 50. The communication interface 20 is a network interface card (NIC) or the like for executing communication with the machine learning device 100 or the like.

The display 30 displays various types of information. For example, the display 30 displays a graphical user interface (GUI) that receives various operations by the developer D, feedback information indicating a result of operation verification on the machine learning algorithm, and the like. The display 30 is, for example, a liquid crystal display, an organic electroluminescence (EL) display, a touch panel, or the like. In addition, the display 30 may be provided separately from the machine learning algorithm integrated management device 1 and display various types of information by communicating with the machine learning algorithm integrated management device 1. Also, when the display 30 is implemented by a touch panel, it may also have the functions of the input interface 40.

The input interface 40 receives various types of input operations by the developer D and outputs electrical signals indicating content of the received input operations to the controller 10. The input interface 40 is implemented, for example, by a keyboard, a mouse, a touch panel, or the like.

The controller 10 includes, for example, a registration receiver 11, a verifier 12, a feedback information generator 13, and a display controller 14. Each functional unit of the controller 10 is implemented by a computer such as a central processing unit (CPU) or a graphics processing unit (GPU) executing a program. Some or all of the functions of the controller 10 may be implemented by hardware such as a large-scale integration (LSI) circuit, an application-specific integrated circuit (ASIC), or a field-programmable gate array (FPGA) or may be implemented by software and hardware in cooperation. The program may be stored in the storage 50 (a storage device including a non-transitory storage medium) in advance or may be stored in a removable storage medium (the non-transitory storage medium) such as a DVD or a CD-ROM and installed when the storage medium is mounted in a drive device.

The registration receiver 11 receives registration of a new machine learning algorithm (the implementation of the algorithm) input by the developer D via the input interface 40. This registration may include a machine learning task, an input/output data format, a computing device (the CPU or the GPU), an execution environment definition (a Docker (registered trademark) image or the like), a hyperparameter definition, and the like corresponding to the machine learning algorithm. The implementation of the algorithm may be one in which a virtual environment is defined at the same time like that of a Docker image, may be only a python file of the program to be executed on the assumption that an execution environment is defined in the system, or may be described in an interactive analysis environment such as a Jupyter Notebook. Examples of methods of registering the implementation of the algorithm include a method of directly uploading a file entity, a method of inputting a file storage location, and a method using a dedicated application programming interface (API) in Docker or the like.

Examples of machine learning tasks include regression, classification, abnormality detection, physical object detection, segmentation, and the like. Also, the machine learning task may be a combination of two or more of regression, classification, abnormality detection, physical object detection, segmentation, and the like. Application destinations such as sales forecast, visual inspection, plant abnormality detection, person detection, and cancer cell extraction may be embodied. If the assumed machine learning task has already been added by another algorithm developer, it may be selected. For this purpose, tasks and algorithms added by other algorithm developers may be listed on the display 30. Examples of data formats handled in the target task include tabular data (structured data), image data, time-series data, audio data, and the like.

A computing device may input resources necessary for execution if they are known. Allowable execution time may be input. When there are no items intentionally input by the developer D, a default value or a recommended value may be displayed on the display 30. Also, parameters capable of being designated when the algorithm is executed or adjustable parameter definitions may be input. A method of setting the parameter definition may be input to a command line, input using the GUI, or input in a file of a JavaScript Object Notation (JSON) format, a Yet Another Markup Language (YAML) format, or the like. When possible values of a variable are limited, it is possible to list values discretely or set a range of a numerical value.

The verifier 12 performs operation verification by executing a machine learning algorithm whose registration has been received by the registration receiver 11 using a verification dataset stored in a verification dataset storage 51 to be described below. In this operation verification, whether or not the minimum specifications required by the system are satisfied (the input/output specification of, for example, whether the file input/output path is correct or the like) is confirmed. When no error has occurred as a result of this operation verification, the machine learning algorithm satisfies the required specifications and is guaranteed to operate normally on the automated machine learning system S. In this case, the verifier 12 stores the machine learning algorithm on which the operation verification has been completed in an algorithm storage 52 to be described below.

On the other hand, when an error has occurred as a result of operation verification, the machine learning algorithm does not satisfy the required specifications and is not guaranteed to operate normally on the automated machine learning system S. In this case, it is assumed that there are parts of the machine learning algorithm that need to be corrected. When an error has occurred in the operation verification by the verifier 12 as described above, the feedback information generator 13 generates feedback information (information for prompting the developer D to correct the machine learning algorithm) for notifying the developer D that the error has occurred. The feedback information generator 13 estimates a cause of the error from the information of the verification result. As types of the error, data input/output format incompatibility, a lack of memory, timeout, and execution environment mismatch are assumed. The error message output by the program may also be used as feedback information.

The display controller 14 performs control for causing the display 30 to display the feedback information generated by the feedback information generator 13 and the like. Also, the display controller 14 causes the display 30 to display a GUI for receiving various types of inputs and instructions from the developer D. The display controller 14 causes the display 30 to display the feedback information and prompts the developer D to make corrections. Because the environment developed by the developer D and the environment in which the automated machine learning system S executes the program do not necessarily match perfectly, unexpected errors may occur. Verification for registering a machine learning algorithm in the automated machine learning system S is automatically performed and the developer D receives the feedback, such that a smooth countermeasure can be performed. The display controller 14 is an example of a "first display controller."

The storage 50 includes, for example, the verification dataset storage 51, the algorithm storage 52, and the metadata storage 53. The verification dataset storage 51 stores a verification dataset for use in operation verification by the verifier 12. The verification dataset is intended only to confirm the normal operation of the machine learning algorithm and is a standard dataset (for example, RGB image data in a Joint Photographic Experts Group (JPEG) format having a data size of 224×224 [px] (hereinafter referred to as a "standard format dataset")). In addition, the verification dataset may be added by the developer D. A plurality of pieces of verification data in a standard format may be set. When a plurality of pieces of verification data are set, the registration of the machine learning algorithm is allowed if none of the data causes an error or if the criterion is satisfied. For example, in the case of an image dataset, both a dataset including a JPEG format image and a dataset including a Portable Network Graphics (PNG) format image may be set as a standard format dataset.

The algorithm storage 52 stores a machine learning algorithm on which the operation verification by the verifier 12 satisfies a specific standard (the operation verification has been completed (determined to be accepted)). The metadata storage 53 stores various types of information (metadata) related to operation verification by the verifier 12. The storage 50 is, for example, a storage device such as a hard disk drive (HDD), a random-access memory (RAM), or a flash memory. In addition, the storage 50 may be implemented by other storage devices connected via a communication network NW such as a network attached storage (NAS) or an external storage server device.

[Machine Learning Device]

The machine learning device 100 includes, for example, a controller 110, a communication interface 120, a display 130, an input interface 140, and a storage 150. The communication interface 120 is a NIC or the like for executing communication with the machine learning algorithm integrated management device 1 and the like.

The display 130 displays various types of information. For example, the display 130 displays a GUI that receives various types of operations by the user U, a machine learning result, and the like. The display 130 is, for example, a liquid crystal display, an organic EL display, a touch panel, or the like. In addition, the display 130 may be provided separately from the machine learning device 100 and display various types of information by communicating with the machine learning device 100. Also, when the display 130 is implemented by a touch panel, it may have the functions of the input interface 140.

The input interface 140 receives various types of input operations by the user U, and outputs an electrical signal indicating content of the received input operation to the controller 110. The input interface 140 is implemented, for example, by a keyboard, a mouse, a touch panel, and the like.

The controller 110 includes, for example, an acquirer 111, a learning controller 112, a preprocessor 113, a trainer 114, and a display controller 115. Each functional unit of the controller 110 is implemented by a computer such as a CPU or a GPU executing a program. Some or all of the functions of the controller 110 may be implemented by hardware such as an LSI circuit, an ASIC, or an FPGA or may be implemented by software and hardware in cooperation. The program may be stored in the storage 150 (a storage device including a non-transitory storage medium) in advance or may be stored in a removable storage medium (the non-transitory storage medium) such as a DVD or a CD-ROM and installed when the storage medium is mounted in a drive device.

The acquirer 111 acquires a machine learning algorithm serving as a machine learning target, metadata, and the like from the machine learning algorithm integrated management device 1 (the algorithm storage 52 and the metadata storage 53) via the communication interface 120 in response to a machine learning execution request from the user U input via the input interface 140. Also, the acquirer 111 acquires a training dataset uploaded by the user U via the input interface 140 and stores the acquired training dataset in the training dataset storage 151 to be described below.

The learning controller 112 controls the execution of machine learning by the preprocessor 113 and the trainer 114 during machine learning. For example, the learning controller 112 controls processing content of the preprocessor 113 and various types of parameters of the machine learning by the trainer 114 in accordance with the result of operation verification by the machine learning algorithm integrated management device 1. The learning controller 112 controls settings related to overall machine learning execution, such as an algorithm to be executed, scheduling of execution, the presence or absence of specific preprocessing, parameters during preprocessing execution, and computing resources allocated to the machine learning execution with respect to items that are not designated by the user U. The learning controller 112 is an example of a "controller."

The preprocessor 113 performs preprocessing on the training dataset stored in the training dataset storage 151 on the basis of control by the learning controller 112.

The trainer 114 trains a model with respect to the training dataset using a machine learning algorithm stored in the algorithm storage 52 of the machine learning algorithm integrated management device 1 on the basis of control by the learning controller 112. The trainer 114 creates a model with machine learning using various methods such as, for example, neural networks, a support vector machine, and a decision tree.

The display controller 115 performs control for causing the display 130 to display information such as a result of evaluating the model generated in the machine learning by the trainer 114. Also, the display controller 115 causes the display 130 to display a GUI for receiving various types of inputs and instructions from the user U. The display controller 115 is an example of a "second display controller."

The storage 150 includes, for example, a training dataset storage 151 and an evaluation result storage 152. The training dataset storage 151 stores a training dataset to be processed by the preprocessor 113 and the trainer 114. The evaluation result storage 152 stores the result of evaluating the model generated in the machine learning by the trainer 114. The storage 150 is, for example, a storage device such as an HDD, a RAM, or a flash memory. In addition, the storage 150 may be implemented by another storage device connected via a communication network NW such as a NAS or an external storage server device.

[Operation Verification Process]

Figure 2:
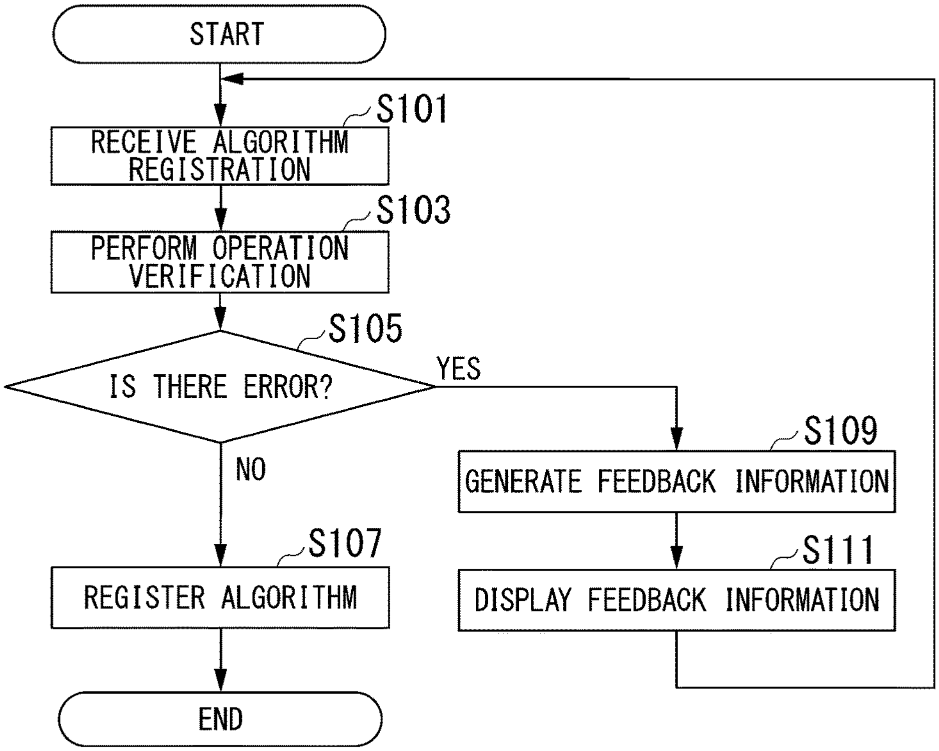
FIG. 2 is a flowchart showing an example of an operation verification process for a machine learning algorithm according to the first embodiment.

Hereinafter, a flow of an operation verification process for a machine learning algorithm in the machine learning algorithm integrated management device 1 will be described. FIG. 2 is a flowchart showing an example of the operation verification process for the machine learning algorithm according to the first embodiment.

First, the registration receiver 11 receives registration of a new machine learning algorithm input by the developer D via the input interface 40 (step S101). This registration may include a definition of an execution environment (a Docker image or the like) and a definition of hyperparameters.

Subsequently, the verifier 12 performs operation verification by executing a machine learning algorithm whose registration has been received by the registration receiver 11 using the verification dataset stored in the verification dataset storage 51 (step S103).

When an error has occurred as a result of operation verification by the verifier 12, the machine learning algorithm does not satisfy the required specifications and is not guaranteed to operate normally on the automated machine learning system S. Thus, when an error has occurred in the operation verification by the verifier 12 (step S105: YES), the feedback information generator 13 generates feedback information for notifying the developer D that an error has occurred (information for prompting the developer D to correct the machine learning algorithm) (step S109). Subsequently, the display controller 14 causes the display 30 to display the feedback information generated by the feedback information generator 13 (step S111). By confirming the feedback information displayed on the display 30, the developer D can ascertain that the machine learning algorithm does not satisfy the specifications and can correct the machine learning algorithm or the like. The developer D performs a re-registration process for the corrected machine learning algorithm via the input interface 40 and then the processing from step S101 is iterated.

On the other hand, when no error has occurred as a result of the operation verification by the verifier 12, the machine learning algorithm satisfies the required specifications and is guaranteed to operate normally on an automated machine learning system S. Thus, when no error has occurred in the operation verification by the verifier 12 (step S105: NO), the verifier 12 registers a machine learning algorithm on which the operation verification has been completed (determined to be accepted) in the algorithm storage 52 (step S107). Thereby, the process of the present flowchart is completed.

In addition, even if the operation verification on the machine learning algorithm is completed normally, a verification result may be saved and presented to the developer D. For example, the prediction accuracy, execution time, a memory usage amount, and the like when model learning and evaluation are performed on the verification dataset may be displayed and the developer D may be able to confirm whether the behavior is as intended.

[Training Process]

Figure 3:
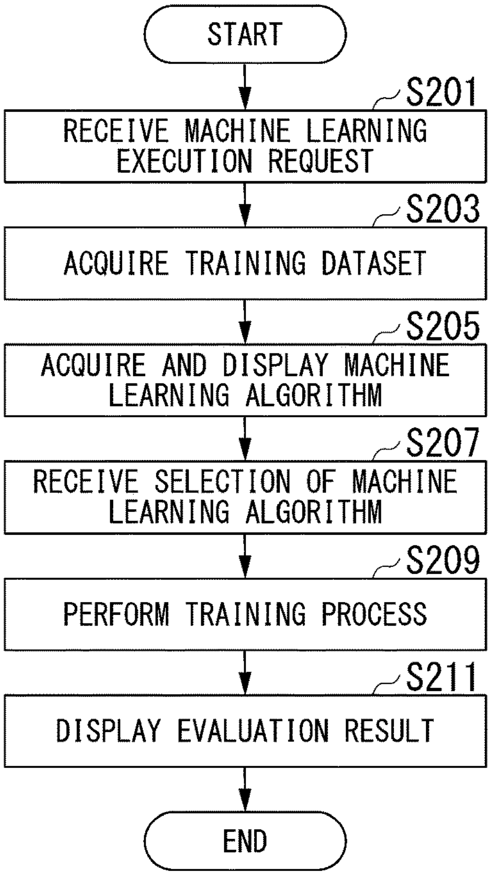
FIG. 3 is a flowchart showing an example of a training process according to the first embodiment.

Subsequently, a flow of a training process of the machine learning device 100 will be described. FIG. 3 is a flowchart showing an example of the training process according to the first embodiment.

First, the acquirer 111 receives a machine learning execution request from the user U input via the input interface 140 (step S201). Also, the acquirer 111 acquires a training dataset uploaded by the user U via the input interface 140 and stores the acquired training dataset in the training dataset storage 151 (step S203). In addition, the training dataset may be stored in the training dataset storage 151 in advance. Alternatively, the training dataset may be collected from one or more external storages having a network connection to the automated machine learning system S.

Subsequently, the acquirer 111 acquires a machine learning algorithm serving as a machine learning target from the machine learning algorithm integrated management device 1 (the algorithm storage 52) via the communication interface 120 and the display controller 115 causes the display 130 to display a list of acquired machine learning algorithms (step S205). For example, the acquirer 111 acquires all machine learning algorithms registered in the algorithm storage 52. The display 130 displays a list of acquired machine learning algorithms and allows the user U to select the algorithm to be executed (step S207). The machine learning algorithms to be displayed may be classified for each machine learning task or may be filtered by a machine learning task input by the user U. The display method may be sorted by setting priority of a proven algorithm or the like or highlighting an algorithm with high priority. A specific algorithm may be selected by default.

In addition, the display 130 may display the hyperparameters of the algorithm registered in the algorithm storage 52 and receive the designation of the user U for each hyperparameter. The user U may input a numerical value or a character string or may select a numerical value or a character string from options. The default value may be preset.

Subsequently, the trainer 114 trains a model with respect to the training dataset using the machine learning algorithm designated by the user U on the basis of control by the learning controller 112 (step S209). The learning controller 112 selects a value from candidate values that each hyperparameter of the machine learning algorithm registered in the algorithm storage 52 can take, sets at least one combination of all hyperparameters, and instructs the trainer 114 to train the model at each setting. Possible values for hyperparameters may be candidates designated in advance by the developer D or candidates generated each time on the basis of other settings such as machine learning tasks. Because the accuracy of machine learning models varies with the hyperparameters even if the same algorithm is used, the accuracy of models trained with different hyperparameter settings may be compared. A hyperparameter search strategy for obtaining optimal hyperparameters may be set. As the strategy, methods such as random search, grid search, Bayesian optimization, and the like may be used.

Subsequently, the display controller 115 causes the display 130 to display information such as a result of evaluating the model generated in the machine learning by the trainer 114 (step S211). The user U can ascertain information such as the model evaluation result by confirming the display 130. As described above, the process of the present flowchart is completed.

That is, the second display controller (the display controller 115) causes a list of machine learning algorithms stored in the algorithm storage 52 to be displayed and the trainer 114 trains a model using a machine learning algorithm designated by the user U among the machine learning algorithms included in the displayed list. Also, as another example, the trainer 114 may select one or more machine learning algorithms stored in the algorithm storage 52 on the basis of the machine learning task designated by the user U and train the model using each selected machine learning algorithm. The second display controller causes hyperparameter items defined in the machine learning algorithm stored in the algorithm storage 52 to be displayed and the trainer 114 trains the model using the hyperparameter value designated by the user with respect to the displayed hyperparameter item. As another example, the trainer 114 may select at least one hyperparameter setting defined in the machine learning algorithm stored in the algorithm storage 52 and train the model using each setting of the selected hyperparameter.

According to the automated machine learning system S of the first embodiment described above, when a new machine learning algorithm is registered in the automated machine learning system S, it is possible to automatically verify and confirm that the minimum specifications are satisfied. Also, in addition to the machine learning algorithm implementation itself, setting information including machine learning tasks, hyperparameters and their domains, computing resources, and the like are received, it is furthermore possible to automatically verify and confirm that the minimum specifications are satisfied, and the developer D easily registers additional new algorithms. That is, it is possible to solve the problem that there is no receiving window of the algorithm newly proposed by the developer D or that the developer himself or herself must confirm whether the specification for new registration is satisfied even if there is a receiving window.

Second Embodiment

Hereinafter, a second embodiment will be described. An automated machine learning system S of the second embodiment has a configuration similar to that of the automated machine learning system S of the first embodiment. In the automated machine learning system S of the second embodiment, content of a verification dataset used during operation verification is different from that of the first embodiment. Hereinafter, the automated machine learning system S of the second embodiment will be described, focusing on differences from the first embodiment.

Figures 4, 5:
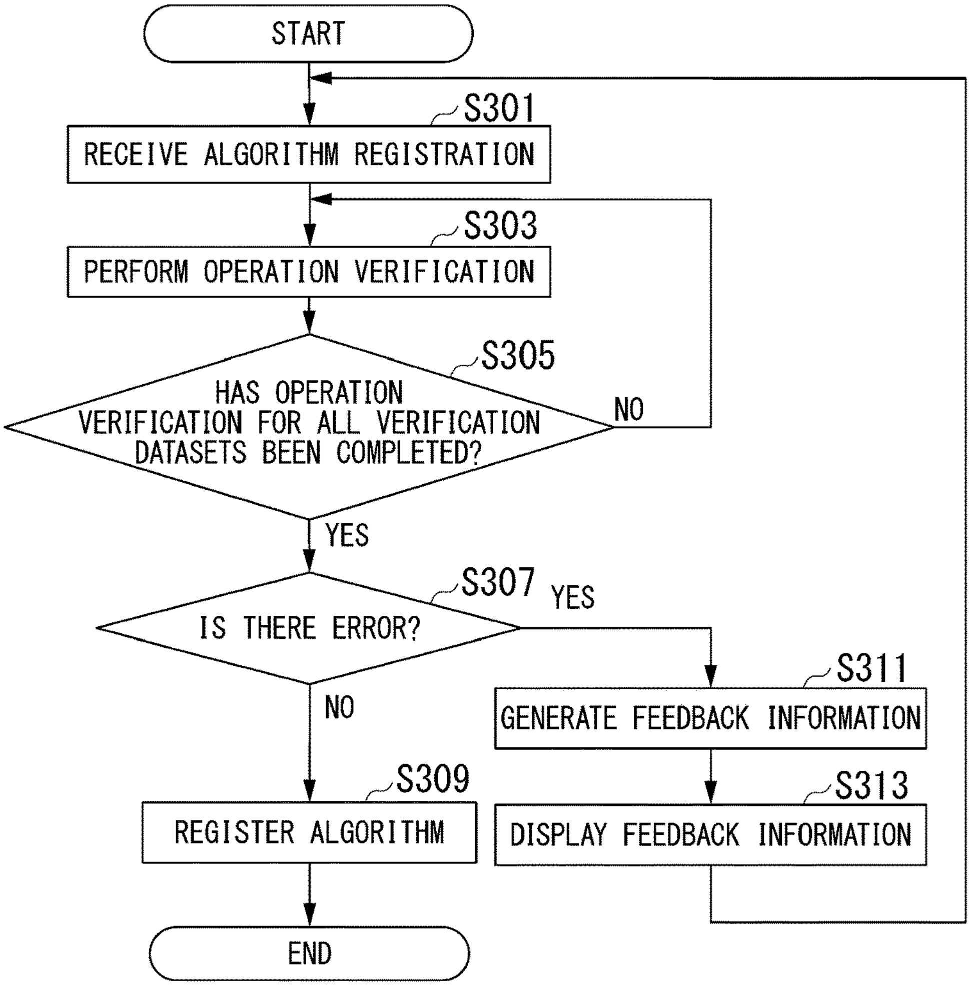
FIG. 4 is a diagram showing an example of a verification dataset VD according to a second embodiment.
FIG. 5 is a flowchart showing an example of an operation verification process for a machine learning algorithm according to the second embodiment.

FIG. 4 is a diagram showing an example of a verification dataset VD according to the second embodiment. As shown in FIG. 4, the verification dataset VD includes a plurality of types of verification datasets. For example, the verification dataset VD includes extended format verification data (data 2 and data 3) (hereinafter referred to as an "extended format dataset") in addition to the standard format dataset (data 1). An extended format dataset has at least one of data formats different from that of the standard format dataset. For example, data 1 (the standard format dataset) is an RGB image dataset in a JPEG format having an image size of 224×224 [px]. On the other hand, data 2 (extended format 1) is an RGB image dataset of a Tagged Image File Format (TIFF) format having an image size of 224×224 [px]. Also, data 3 (extended format 2) is an RGB image dataset in a JPEG format having a non-uniform image size.

Some image recognition algorithms can support only specific resolution due to the specifications of the algorithm. Also, an algorithm capable of handling variable-sized images with precise implementation may be implemented in a state in which only specific resolution is assumed due to the difficulty of implementation and other images may not be processed. Assuming such a situation, operation verification is performed using a plurality of types of verification datasets.

[Operation Verification Process]

Hereinafter, a flow of an operation verification process for the machine learning algorithm by the machine learning algorithm integrated management device 1 will be described. FIG. 5 is a flowchart showing an example of the operation verification process for the machine learning algorithm according to the second embodiment.

First, the registration receiver 11 receives registration of a new machine learning algorithm input by the developer D via the input interface 40 (step S301).

Subsequently, the verifier 12 performs operation verification by executing a machine learning algorithm whose registration has been received by the registration receiver 11 using any one of a plurality of verification datasets stored in the verification dataset storage 51 (step S303).

Subsequently, the verifier 12 determines whether or not operation verification for all verification datasets stored in the verification dataset storage 51 has been completed (step S305). When it is determined that operation verification for all verification datasets has not been completed (step S305: NO), the verifier 12 executes the machine learning algorithm whose registration has been received by the registration receiver 11 using any one of the plurality of types of verification datasets stored in the verification dataset storage 51 for which the operation verification has not yet been performed (step S303) and the subsequent processing is iterated.

On the other hand, when it is determined that operation verification for all verification datasets has been completed (step S305: YES), the verifier 12 determines whether or not an error has occurred in any operation verification for the plurality of verification datasets (step S307). When it is determined that an error has occurred in the operation verification (step S307: YES), the feedback information generator 13 generates feedback information (step S311). Subsequently, the display controller 14 causes the display 30 to display the feedback information generated by the feedback information generator 13 (step S313).

Figure 6A:
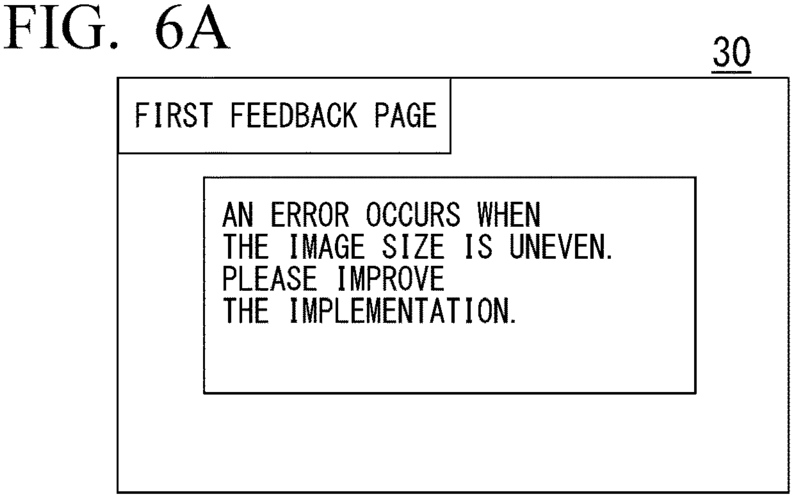
FIG. 6A is a diagram showing an example of feedback information according to the second embodiment.
Figure 6B:
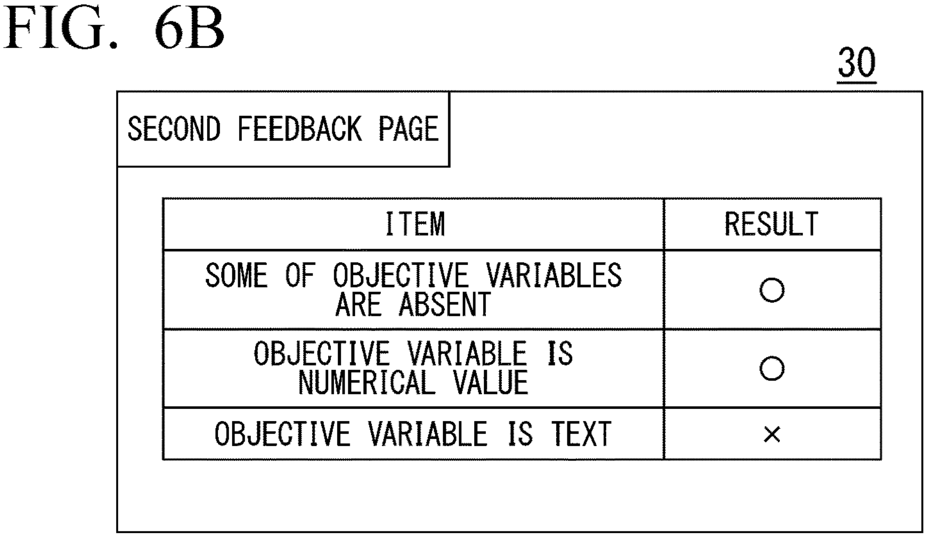
FIG. 6B is a diagram showing an example of feedback information according to the second embodiment.
Figure 6C:
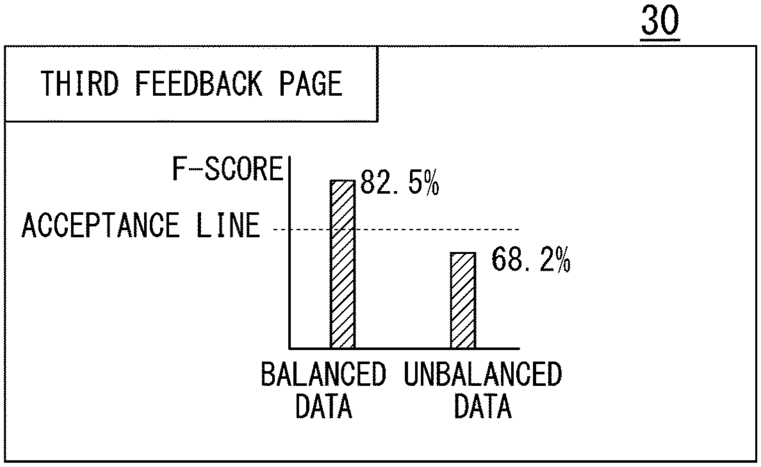
FIG. 6C is a diagram showing an example of feedback information according to the second embodiment.

FIGS. 6A to 6C are diagrams showing an example of feedback information according to the second embodiment. For example, when the operation verification is performed using data 1 (standard format), data 2 (extended format 1), and data 3 (extended format 2) as shown in FIG. 4 and no error occurs in data 1 (standard format) and data 2 (extended format 1) (acceptance), but an error occurs in data 3 (extended format 2) (rejection), a first feedback page displaying a message such as "An error occurs when the image size is uneven. Please improve the implementation" as shown in FIG. 6A is displayed on the display 30. By confirming such a feedback page, the developer D can ascertain that the machine learning algorithm does not satisfy the specifications, and can perform a process of correcting the machine learning algorithm or the like. The developer D performs a re-registration process for the corrected machine learning algorithm via the input interface 40 and then the processing from step S301 is iterated.

Also, as shown in FIG. 6B, the feedback information may indicate the verification result for each item of the verification dataset. Alternatively, as shown in FIG. 6C, it may indicate an index value (for example, an F-score) of accuracy for each verification dataset.

On the other hand, when it is determined that no error has occurred in the operation verification (step S307: NO), the verifier 12 registers the machine learning algorithm on which the operation verification has been completed (determined to be accepted) in the algorithm storage 52 (step S309). As described above, the process of the present flowchart is completed.

That is, the verification dataset includes at least one standard format dataset and at least one extended format dataset. If a result of the operation verification using the standard format dataset is accepted and a result of the operation verification using the extended format dataset is rejected, the verifier 12 estimates a cause of the rejection from a data format difference between the standard format dataset and the extended format dataset. The feedback information generator 13 generates the feedback information including the estimated cause of the rejection.

Also, the standard format dataset is an image dataset unified in a specific file format, resolution, the number of channels, and color depth. The extended format dataset is an image dataset in which at least one of a file format, resolution, the number of channels, color depth, and the number of images is different or an image dataset having a different number of images. The verifier 12 estimates a difference between the standard format dataset and the extended format dataset as the cause of the rejection.

According to the automated machine learning system S of the second embodiment described above, when a new machine learning algorithm is registered in the automated machine learning system S, it is possible to automatically verify and confirm that the minimum specifications are satisfied. Also, it is possible to automatically verify and manage the execution conditions of new machine learning algorithms that are difficult for the developer D to comprehensively ascertain by performing operation verification using a plurality of types of verification datasets. That is, additional registration of machine learning algorithms is facilitated in the sense that the applicability of new machine learning algorithms to realistic datasets can be confirmed without increasing the burden on the developer D.

In addition, as another example, when an algorithm for a regression task of tabular data is added, it is assumed that a dataset including only real-valued variables is set as a standard format dataset. In this case, as the extended format dataset, a dataset including missing value data, a dataset including categorical variables, a dataset including text data, a dataset including timestamp data, a dataset having a different sample size, or the like may be set. Regression algorithms targeting tabular data may or may not be able to train and predict a model even if missing values are included as algorithm specifications. For example, random forests and gradient boosting trees can directly handle data including missing values, but a support vector machine and a multilayer perceptron (MLP) cannot handle data with missing values in their inputs, so they use a combination of missing value imputation methods.

That is, the standard format dataset is a tabular dataset including only real-valued variables. The extended format dataset is a tabular dataset including at least one of a categorical variable, text data, timestamp data, and a missing value or a tabular dataset having a different sample size. The verifier 12 estimates a difference between the standard format dataset and the extended format dataset as the cause of the rejection.

When an extended format dataset is set, a difference of the extended format dataset from the standard format dataset is saved. As a verification result, when no error occurs in the standard format dataset and an error occurs in the extended format dataset, the feedback information generator 13 estimates the difference as the cause of the error and feeds the estimated difference back to the developer D through the display 30. The developer D can add preprocessing or the like to the algorithm so that the algorithm can be used for extended format data.

Third Embodiment

Hereinafter, a third embodiment will be described. An automated machine learning system S of the third embodiment is different from the first embodiment in the processing content during operation verification. Hereinafter, the automated machine learning system S of the third embodiment will be described, focusing on differences from the first embodiment.

Figure 7:
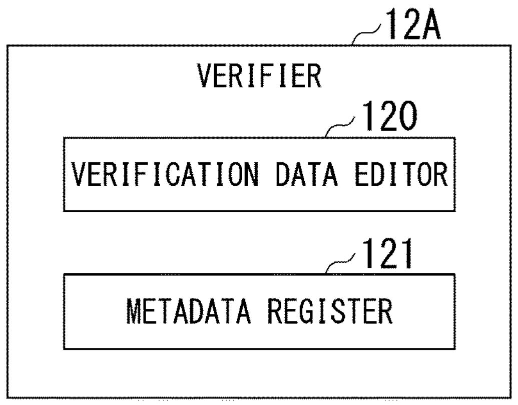
FIG. 7 is a diagram showing an example of functional blocks of a verifier 12A according to a third embodiment.

FIG. 7 is a diagram showing an example of a functional block of the verifier 12A provided in the machine learning algorithm integrated management device 1 according to the third embodiment. As shown in FIG. 7, the verifier 12A includes, for example, a verification data editor 12-1 and a metadata register 12-2.

The verification data editor 12-1 edits a verification dataset (data 1 in a standard format) stored in the verification dataset storage 51 and generates data in which at least one of the data format items is different from data 1. For example, the verification data editor 12-1 edits data 1 (RGB image data in a standard format or a JPEG format having an image size of 224×224 [px]) and generates data 2 that is RGB image data of a TIFF format in which the image size is 224×224 [px]. Also, the verification data editor 12-1 edits data 1 to generate data 3, which is RGB image data of a JPEG format having an uneven image size.

On the basis of a result of operation verification using a plurality of types of verification data as described above, the metadata register 12-2 associates metadata that defines preprocessing to be applied during machine learning execution with the machine learning algorithm and registers the metadata associated with the machine learning algorithm in the metadata storage 53. The metadata may be, for example, represented in a JSON format.

[Operation Verification Process]

Figure 8:
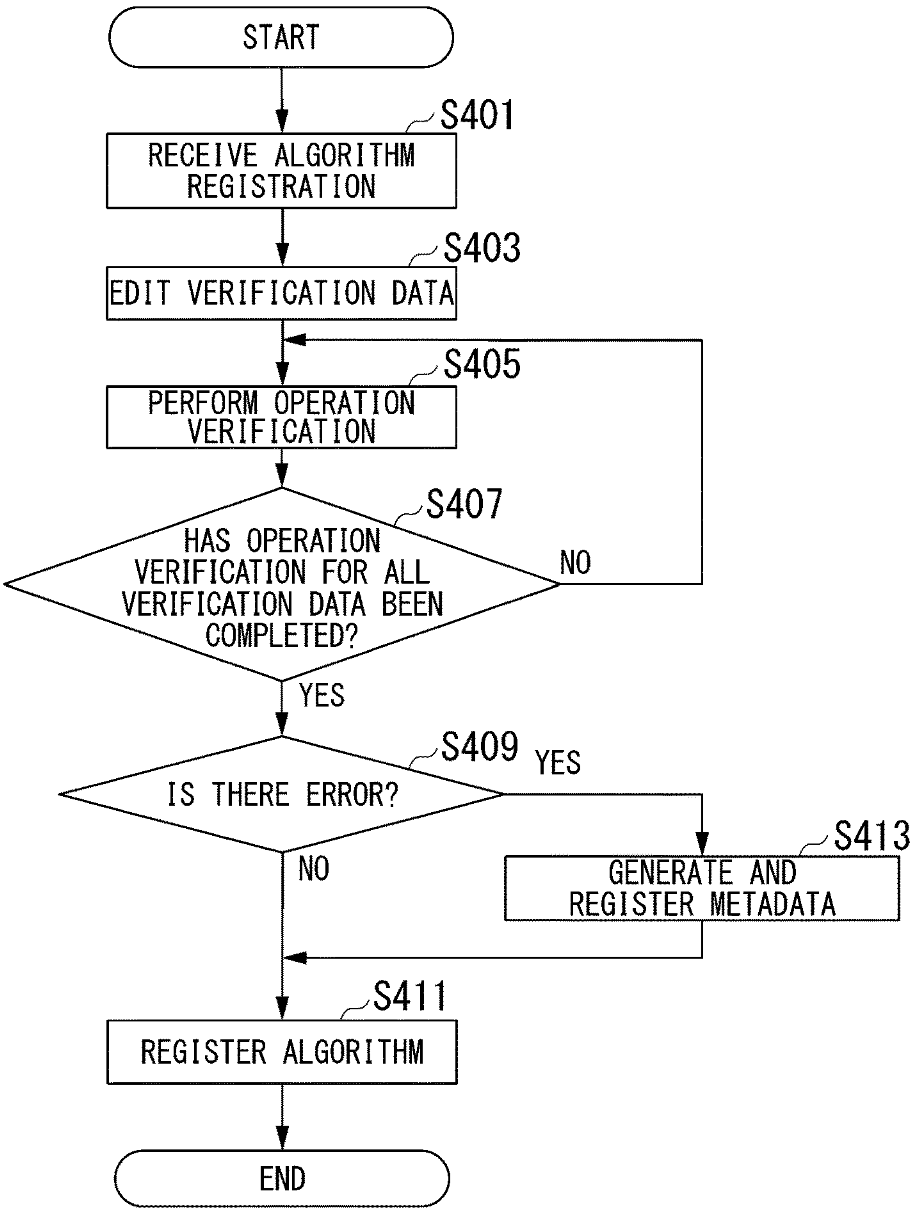
FIG. 8 is a flowchart showing an example of an operation verification process for a machine learning algorithm according to the third embodiment.

Hereinafter, the flow of an operation verification process for a machine learning algorithm in the machine learning algorithm integrated management device 1 will be described. FIG. 8 is a flowchart showing an example of the operation verification process for the machine learning algorithm according to the third embodiment.

First, the registration receiver 11 receives registration of a new machine learning algorithm input by the developer D via the input interface 40 (step S401).

Subsequently, the verification data editor 12-1 edits a verification dataset (data 1 in the standard format) stored in the verification dataset storage 51 and generates data having at least one of data format items different from data 1 (step S403).

Subsequently, the verifier 12 performs operation verification by executing a machine learning algorithm whose registration has been received by the registration receiver 11 using any one of the plurality of verification datasets generated by the verification data editor 12-1 (step S405).

Subsequently, the verifier 12 determines whether or not operation verification for all the plurality of types of verification datasets has been completed (step S407). When it is determined that operation verification for all the plurality of types of verification datasets has not been completed (step S407: NO), the verifier 12 performs operation verification by executing the machine learning algorithm whose registration has been received by the registration receiver 11 (step S405) and the subsequent processing is iterated.

When it is determined that operation verification for all the plurality of types of verification datasets has been completed (step S407: YES), the verifier 12 determines whether or not an error has occurred in any operation verification for the plurality of types of verification datasets (step S409). When it is determined that an error has occurred in the operation verification (step S409: YES), the metadata register 12-2 generates metadata that defines preprocessing to be applied during machine learning execution on the basis of a result of operation verification using a plurality of types of verification data and registers the metadata in the metadata storage 53 (step S413).

For example, when operation verification is performed using each piece of the above-described data 1 (standard format), data 2 (edited data), and data 3 (edited data), and no error has occurred in data 1 (standard format) and data 2 (edited data), but an error has occurred in data 3 (edited data), the metadata register 12-2 generates metadata indicating that preprocessing for adjusting (uniformizing) the image size is necessary (metadata indicating that a change in the file format is unnecessary) on the basis of the fact that "the image size is uneven," which is a difference between data 1 (without an error) and data 3 (with an error) and registers the metadata in the metadata storage 53.

On the other hand, when it is determined that no error has occurred in the operation verification (step S409: NO) or after the metadata registration by the metadata register 12-2 is completed, the verifier 12 registers the machine learning algorithm on which operation verification has been completed in the algorithm storage 52 (step S411). As described above, the process of the present flowchart is completed.

[Training Process]

Figure 9:
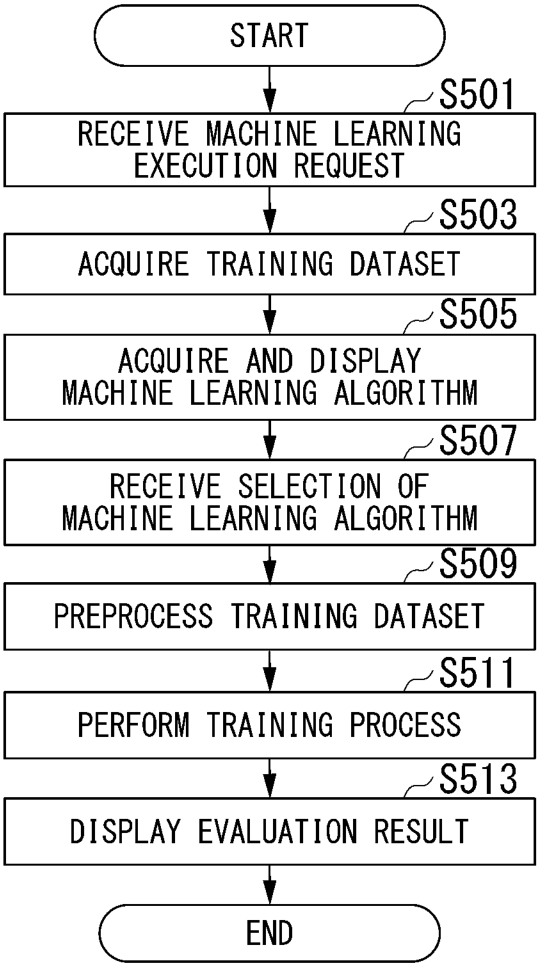
FIG. 9 is a flowchart showing an example of a training process according to the third embodiment.

Next, a flow of a training process of the machine learning device 100 will be described. FIG. 9 is a flowchart showing an example of the training process according to the third embodiment.

First, the acquirer 111 receives a machine learning execution request from the user U input via the input interface 140 (step S501). Also, the acquirer 111 acquires a training dataset uploaded by the user U via the input interface 140 and stores the acquired training dataset in the training dataset storage 151 (step S503).

Subsequently, the acquirer 111 acquires a machine learning algorithm serving as a machine learning target, metadata, and the like from the machine learning algorithm integrated management device 1 (the algorithm storage 52 and the metadata storage 53) via the communication interface 120 in response to the received execution request and the display controller 115 causes the display 130 to display a list of acquired machine learning algorithms (step S505). The display 130 displays the list of acquired machine learning algorithms and allows the user U to select an algorithm to be executed (step S507). Alternatively, the display 130 may cause the display 130 to display a list of machine learning tasks, cause the user U to select a machine learning task, and execute the following model training process using each machine learning algorithm with respect to one or more of the machine learning algorithms stored in the algorithm storage 52 corresponding to the selected machine learning task.

Subsequently, the preprocessor 113 performs preprocessing on the training dataset stored in the training dataset storage 151 on the basis of the metadata acquired by the acquirer 111 on the basis of control by the learning controller 112 (step S509). For example, when the metadata associated with the machine learning algorithm indicates that preprocessing for adjusting (uniformizing) the image size is necessary, the preprocessor 113 adjusts (uniformizes) the image size with respect to the training dataset as preprocessing.

In addition, a plurality of methods may be set for the preprocessing for converting the extended format dataset into the standard format dataset. For example, in the machine learning task of image recognition, preprocessing for changing an aspect ratio may be applied with respect to preprocessing for converting a rectangular image into a square image or an image trimming process may be performed. In the task of imputing the missing value in the regression task of the table format data, the median imputation may be used, the missing value may be imputed in a K-nearest neighbor method, or the missing value may be imputed in a multiple substitution method. When a plurality of pieces of preprocessing are set, the machine learning device 100 may execute each processing step, adopt the better evaluation result, and display the result on the display 130.

Subsequently, the trainer 114 trains a model for the training dataset preprocessed by the preprocessor 113 using a machine learning algorithm designated by the user U on the basis of control by the learning controller 112 (step S511). An image size is adjusted (uniformized) for the preprocessed training dataset used in this training, so that no error occurs when the machine learning algorithm is executed.

Subsequently, the display controller 115 causes the display 130 to display information such as a result of evaluating the model generated in machine learning by the trainer 114 (step S513). The user U can ascertain information such as the model evaluation result by confirming the display 130. As described above, the process of the present flowchart is completed.

That is, there are further provided the metadata register 12-2 configured to store an item of an extended format dataset in the metadata storage 53 as preprocessing to be applied when machine learning is executed when the verification dataset includes at least one standard format dataset and at least one extended format dataset, a result of operation verification using the standard format dataset is accepted, and a result of operation verification using the extended format dataset is rejected and the preprocessor 113 configured to execute a process of converting a training dataset to be preprocessed into a standard format with reference to the metadata storage 53.

According to the automated machine learning system S of the third embodiment described above, when a new machine learning algorithm is registered in the automated machine learning system S, it is possible to automatically verify and confirm that the minimum specifications are satisfied. Also, the automated machine learning system S can actively control the preprocessing necessary during machine learning execution that is not ascertained by the developer D when a new machine learning algorithm is registered. Thus, the developer D does not need to be aware of the specifications of the execution environment in detail and the burden related to registering the machine learning algorithm is reduced. Also, unnecessary preprocessing can be prevented from being performed.

Fourth Embodiment

Hereinafter, a fourth embodiment will be described. An automated machine learning system S of the fourth embodiment is different from the third embodiment in that processing content during operation verification is different. Hereinafter, the automated machine learning system S of the fourth embodiment will be described, focusing on differences from the third embodiment.

The verification data editor 12-1 edits a verification dataset (data 1 in a standard format) stored in a verification dataset storage 51 and generates data having a data structure (the number of pieces of normal data and the number of pieces of abnormal data) different from data 1. For example, the verification data editor 12-1 edits data 1 (an image classification dataset, 500 pieces of normal data, and 500 pieces of abnormal data) and generates data 2 (an image classification dataset, 5,000 pieces of normal data, and 500 pieces of abnormal data).

[Operation Verification Process]

Figure 10:
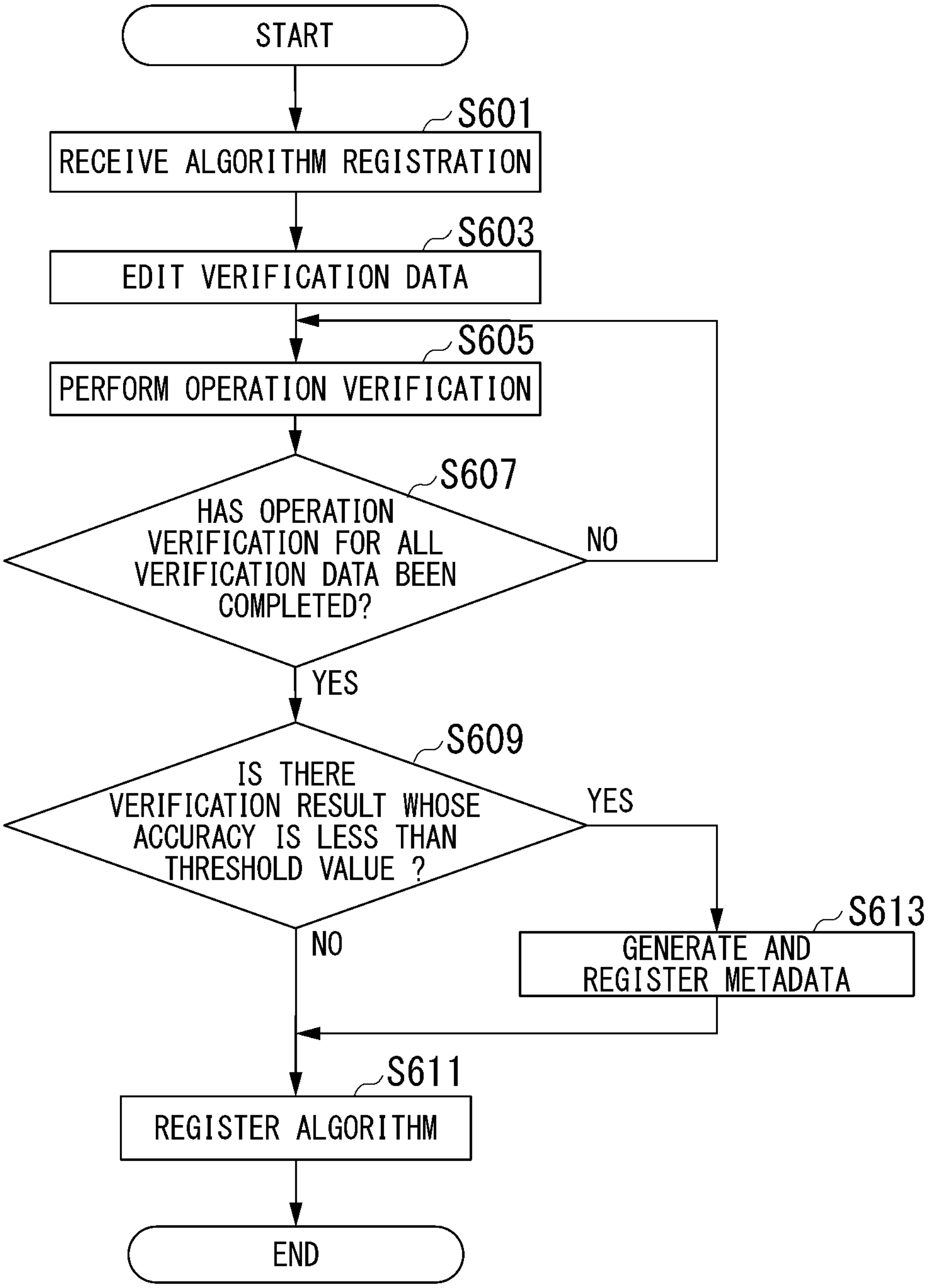
FIG. 10 is a flowchart showing an example of an operation verification process for a machine learning algorithm according to a fourth embodiment.

Hereinafter, a flow of an operation verification process for a machine learning algorithm in a machine learning algorithm integrated management device 1 will be described. FIG. 10 is a flowchart showing an example of the operation verification process for the machine learning algorithm according to the fourth embodiment.

First, the registration receiver 11 receives registration of a new machine learning algorithm input by a developer D via an input interface 40 (step S601).

Subsequently, the verification data editor 12-1 edits a verification dataset (data 1 in a standard format) stored in the verification dataset storage 51 and generates data having a data structure (the number of pieces of normal data and the number of pieces of abnormal data) different from that of data 1 (data in which the number of pieces of normal data and the number of pieces of abnormal data are unbalanced) (step S603).

Subsequently, the verifier 12 performs operation verification by executing a machine learning algorithm whose registration has been received by the registration receiver 11 using any one of the plurality of verification datasets generated by the verification data editor 12-1 (step S605).

Subsequently, the verifier 12 determines whether or not operation verification for all the plurality of types of verification datasets has been completed (step S607). When it is determined that operation verification for all the plurality of types of verification datasets has not been completed (step S607: NO), the verifier 12 performs operation verification by executing a machine learning algorithm whose registration has been received by the registration receiver 11 using any one verification dataset for which operation verification has not been performed among the plurality of verification datasets (step S605) and the subsequent processing is iterated.

On the other hand, when it is determined that operation verification for all the plurality of types of verification datasets has been completed (step S607: YES), the verifier 12 determines whether or not the accuracy (for example, an F-score) in the operation verification for the plurality of types of verification datasets is less than a prescribed threshold value (step S609). When it is determined that there is a verification result having the accuracy less than the prescribed threshold value (step S609: YES), the metadata register 12-2 generates metadata that defines the preprocessing to be applied during machine learning execution on the basis of the operation verification result using a plurality of types of verification data and registers the metadata in the metadata storage 53 (step S613).

For example, when operation verification is performed using the above-described data 1 (standard format) and data 2 (edited data) and the accuracy of data 1 (standard format) exceeds a prescribed threshold value, but the accuracy of data 2 (edited data) is less than the prescribed threshold value, the metadata register 12-2 generates metadata indicating that preprocessing is required to balance the data structure on the basis of the fact that data is data in which there is a difference between data 1 and data 2 and "the number of pieces of normal data and the number of pieces of abnormal data are unbalanced" and registers the metadata in the metadata storage 53. Thus, the prediction accuracy may be significantly lowered in machine learning algorithms that are not assumed to handle unbalanced datasets. In this case, by setting preprocessing that balances the data structure, the machine learning device 100 solves this problem by adding preprocessing for thinning out normal data in an under-sampling process, and the algorithm developer's correction effort and time can be reduced.

On the other hand, when it is determined that there is no verification result whose accuracy is less than a prescribed threshold value in the operation verification (step S609: NO) or after the metadata registration by the metadata register 12-2 is completed, the verifier 12 registers the machine learning algorithm on which operation verification has been completed in the algorithm storage 52 (step S611). Thereby, the process of the present flowchart is completed. In the training process executed thereafter, preprocessing is executed to balance the data structure of training data on the basis of metadata. Thereby, it is possible to perform an appropriate training process while avoiding a decrease in accuracy.

That is, the verification dataset includes at least one standard format dataset and at least one extended format dataset. The verifier 12 executes the machine learning algorithm to perform an accuracy test for model training and estimates the cause of the rejection from a data property difference between the standard format dataset and the extended format dataset if a result of the accuracy test using the standard format dataset satisfies an accuracy criterion and a result of the accuracy test using the extended format dataset does not satisfy the accuracy criterion. The feedback information generator 13 generates the feedback information including the estimated cause of the rejection.

Also, the standard format dataset is an image dataset in which image data including only normalized luminance values is input and values or labels serving as objective variables are unbiased. The extended format dataset includes a deviation value in an input image, includes a biased value or label in the objective variable, or has a different number of images. The verifier 12 estimates the difference between the standard format dataset and the extended format dataset as the cause of the rejection.

Also, the standard format dataset is a tabular dataset including only normalized real-valued variables and in which values or labels serving as objective variables are unbiased. The extended format dataset includes a deviation value in an explanatory variable, includes a biased value or label in the objective variable, or has a different sample size. The verifier 12 estimates the difference between the standard format dataset and the extended format dataset as the cause of the rejection.

Also, the verification dataset includes at least one standard format dataset and at least one extended format dataset. The verifier 12 executes the machine learning algorithm to perform an accuracy test for model training. There are further provided the metadata register 12-2 configured to store an item of the extended format dataset in the metadata storage 53 as preprocessing to be applied when the machine learning is executed if a result of the accuracy test using the standard format dataset satisfies an accuracy criterion and a result of the accuracy test using the extended format dataset does not satisfy the accuracy criterion; and the preprocessor 113 configured to execute a process of converting the training dataset to be preprocessed into a standard format with reference to the metadata storage 53.

According to the automated machine learning system S of the fourth embodiment described above, it is possible to automatically verify and confirm that the minimum specifications are satisfied when a new machine learning algorithm is registered in the automated machine learning system S. Also, the automated machine learning system S can actively control the preprocessing necessary during machine learning execution that is not ascertained by the developer D when a new machine learning algorithm is registered. Thus, the developer D does not need to be aware of the specifications of the execution environment in detail and the burden related to registering the machine learning algorithm is reduced. Also, unnecessary preprocessing can be prevented from being performed.

Fifth Embodiment

Hereinafter, a fifth embodiment will be described. An automated machine learning system S of the fifth embodiment is different from the first embodiment in that processing content during operation verification is different. Hereinafter, the automated machine learning system S of the fifth embodiment will be described, focusing on differences from the first embodiment.

In the automated machine learning system S of the fifth embodiment, the feedback information generator 13 of the machine learning algorithm integrated management device 1 generates comparison result information for presenting a comparison between a result of operation verification on an existing machine learning algorithm and a result of operation verification on a new machine learning algorithm to the developer D in place of or in addition to feedback information for notifying that the error has occurred. The display controller 14 causes the display 30 to display the comparison result information.

FIG. 11 is a diagram showing an example of a verification result comparison page according to the fifth embodiment. As shown in FIG. 11, comparisons between the operation verification results for the existing machine learning algorithms (A and B) and the operation verification result for the new machine learning algorithm are presented with respect to "accuracy," "execution time," and "used GPU memory." After confirming such a verification result comparison page, the developer D can determine the effectiveness of the new machine learning algorithm and determine whether or not to register the new machine learning algorithm.

As described above, the machine learning algorithm integrated management device 1 may enable registration of a plurality of machine learning algorithms for one machine learning task. When the developer D registers a new algorithm, if other algorithms for the same type of machine learning task are registered, a verification process may also be performed for the algorithm and the results may be able to be compared. Also, the verification result may be saved in the storage 50. If the verification result has already been saved, the result may be used.

Also, in relation to the comparisons with the verification results for other algorithms, one or more criteria regarding accuracy, execution time, computing resources, and the like may be provided and a new machine learning algorithm may be registered only when the criteria are satisfied. Also, in relation to the comparisons with the verification results for other algorithms, information such as accuracy, execution time, and computing resources may be presented to the developer D and the algorithm developer may select whether or not to register a new machine learning algorithm.

That is, the verifier 12 compares the result of the operation verification on the machine learning algorithm with results of operation verification on other mechanical learning algorithms of the same type with respect to at least one of accuracy, execution time, and computing resources.

According to the automated machine learning system S of the fifth embodiment described above, when a new machine learning algorithm is registered in the automated machine learning system S, it is possible to automatically verify and confirm that the minimum specifications are satisfied. Also, by presenting the verification result comparison page to the developer D, it is possible to determine the effectiveness of the new machine learning algorithm and it is possible to determine whether or not to register the new machine learning algorithm. That is, it is possible to decide on whether or not to register a new machine learning algorithm in relative evaluation associated with other algorithms. This enables a process of assisting algorithm developers who have developed a new machine learning algorithm to decide on whether or not to register the algorithm in the machine learning algorithm integrated automated machine learning system S and preventing algorithms with relatively low-performance expectations from being registered unnecessarily.

Sixth Embodiment

Hereinafter, a sixth embodiment will be described. An automated machine learning system S of the sixth embodiment has a configuration similar to that of the automated machine learning system S of the third embodiment. The automated machine learning system S of the sixth embodiment is different from that of the third embodiment in that, during operation verification, an error elimination method (metadata content) is presented to the developer D by standardizing the error verification dataset and performing operation verification again. Hereinafter, the automated machine learning system S of the sixth embodiment will be described, focusing on differences from the third embodiment.

[Operation Verification Process]

Figure 12:
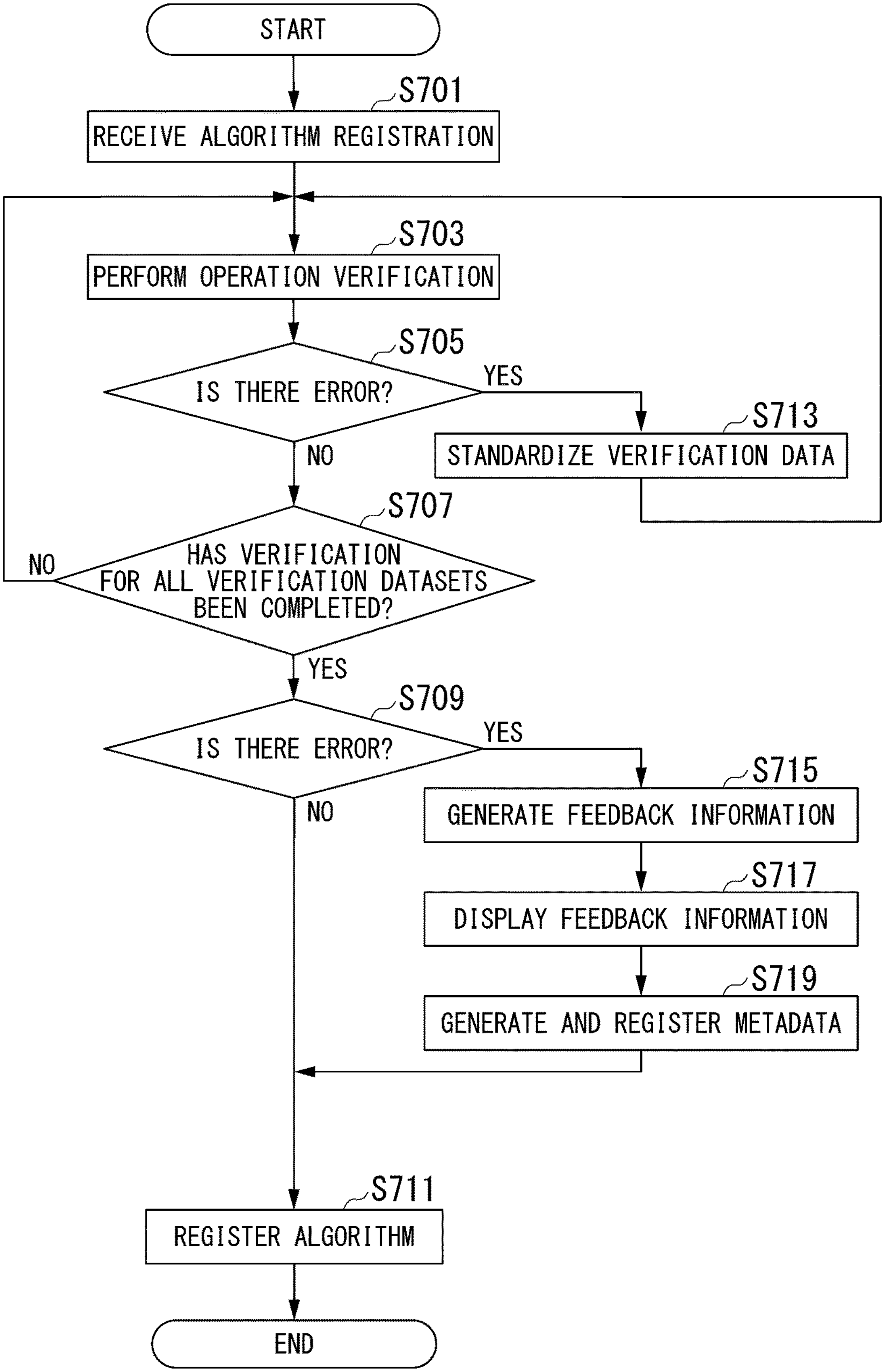
FIG. 12 is a flowchart showing an example of an operation verification process for a machine learning algorithm according to a sixth embodiment.

Hereinafter, a flow of an operation verification process for a machine learning algorithm in the machine learning algorithm integrated management device 1 will be described. FIG. 12 is a flowchart showing an example of the operation verification process for the machine learning algorithm according to the sixth embodiment. In addition, an example in which data 1 (standard format) and data 3 (extended format 2) as shown in FIG. 4 are stored in the verification dataset storage 51 will be described.

First, the registration receiver 11 receives registration of a new machine learning algorithm input by the developer D via the input interface 40 (step S701).

Subsequently, the verifier 12 performs operation verification by executing a machine learning algorithm whose registration has been received by the registration receiver 11 using any one of a plurality of types of verification datasets stored in the verification dataset storage 51 (step S703).

Subsequently, the verifier 12 determines whether or not an error has occurred as a result of the operation verification (step S705). When it is determined that an error has occurred in the operation verification by the verifier 12 (step S705: YES), the verification data editor 12-1 standardizes an erroneous verification dataset (step S713) and performs operation verification again (step S703). The standardization is to change the data format to a prescribed standard format. For example, when data 3 (extended format 2) becomes erroneous, the verification data editor 12-1 unifies (standardizes) an image size so that data 3 has a standard format.

Subsequently, the verifier 12 determines whether or not operation verification for all verification datasets stored in the verification dataset storage 51 has been completed (step S707). When it is determined that operation verification for all verification datasets has not been completed (step S707: NO), the verifier 12 performs operation verification by executing the machine learning algorithm whose registration has been received by the registration receiver 11 using any one of the plurality of verification datasets stored in the verification dataset storage 51 (step S703) and the subsequent processing is iterated.

On the other hand, when it is determined that operation verification for all verification datasets stored in the verification dataset storage 51 has been completed (step S707: YES), the verifier 12 determines whether or not an error has occurred in any one of operation verification processes for the plurality of types of verification datasets (step S709). When it is determined that an error has occurred in the operation verification (step S709: YES), the feedback information generator 13 generates feedback information (step S715). Subsequently, the display controller 14 causes the display 30 to display the feedback information generated by the feedback information generator 13 (step S717). When the developer D has input an instruction for confirming the feedback information and allowing registration, the metadata register 12-2 generates metadata that defines preprocessing to be applied during machine learning execution and registers the metadata in the metadata storage 53 (step S719).

For example, in the operation verification, if data 3 (extended format 2) becomes erroneous and an error is eliminated as a result of standardizing data 3 (unifying the image size), content indicating an error elimination method indicating, for example, "an error occurred in data with an uneven image size, but the error can be eliminated by performing standardization" is shown in the feedback information.

On the other hand, when it is determined that no error has occurred in the operation verification (step S709: NO) or when metadata registration has been completed, the verifier 12 registers a machine learning algorithm on which operation verification has been completed in the algorithm storage 52 (step S711). Thereby, the process of the present flowchart is completed.

In addition, even if there is no problem in execution in the extended format dataset, the verification data editor 12-1 may perform a process of converting the extended format dataset into a standard format dataset and cause the display 30 to display a result in this case. Thereby, side effects due to uniform application of preprocessing can be confirmed. Also, when the verification result is that "there is no functional problem even if preprocessing is performed, but the performance is improved by performing preprocessing," the machine learning algorithm may be treated as requiring the preprocessing.

That is, the verification data editor 12-1 that performs a standardization process for converting the extended format dataset into the format of the standard format dataset is further provided, and the verifier 12 performs operation verification using a standardized dataset.

According to the automated machine learning system S of the sixth embodiment described above, when a new machine learning algorithm is registered in the automated machine learning system S, it is possible to automatically verify and confirm that the minimum specifications are satisfied. Furthermore, an error elimination means (preprocessing content) by standardization can be presented to the developer D and confirmed. Thereby, it is possible to confirm whether preprocessing not intended by the developer D is performed without permission.

Seventh Embodiment

Hereinafter, a seventh embodiment will be described. An automated machine learning system S of the seventh embodiment has a configuration similar to that of the automated machine learning system S of the third embodiment. In the automated machine learning system S of the seventh embodiment is different from that of the third embodiment in that, a pattern of computer resources (a CPU, a GPU, and the like) (hereinafter referred to as a "verification resource pattern") is changed and verified during operation verification. Hereinafter, the automated machine learning system S of the seventh embodiment will be described, focusing on differences from the third embodiment.

[Operation Verification Process]

Figure 13:
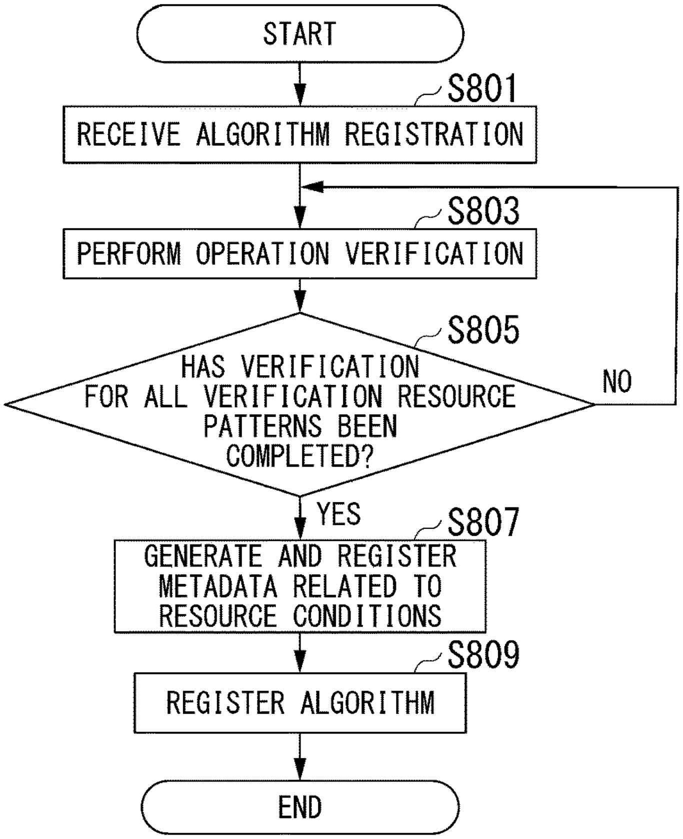
FIG. 13 is a flowchart showing an example of an operation verification process for a machine learning algorithm according to a seventh embodiment.

Hereinafter, a flow of an operation verification process for a machine learning algorithm in the machine learning algorithm integrated management device 1 will be described. FIG. 13 is a flowchart showing an example of the operation verification process for the machine learning algorithm according to the seventh embodiment.

First, the registration receiver 11 receives registration of a new machine learning algorithm input by the developer D via the input interface 40 (step S801).

Subsequently, the verifier 12 performs operation verification by executing a machine learning algorithm whose registration has been received by the registration receiver 11 using any one of a plurality of predefined verification resource patterns (step S803). For example, the verifier 12 performs operation verification using verification resource pattern 1 (2 CPUs).

Subsequently, the verifier 12 determines whether or not operation verification for all the plurality of verification resource patterns has been completed (step S805). When it is determined that operation verification for all the plurality of verification resource patterns has not been completed (step S805: NO), the verifier 12 performs operation verification by executing a machine learning algorithm whose registration has been received by the registration receiver 11 using any one of the plurality of verification resource patterns for which operation verification has not been performed (step S803) and the subsequent processing is iterated. For example, the verifier 12 performs operation verification using verification resource pattern 2 (a combination of two CPUs and one GPU).

On the other hand, when it is determined that operation verification for all the plurality of verification resource patterns has been completed by the verifier 12 (step S805: YES), the metadata register 12-2 generates metadata that defines the resource conditions to be applied during machine learning execution on the basis of a results of operation verification for the plurality of verification resource patterns, and registers the metadata in the metadata storage 53 (step S807).

For example, when 4 hours are required for a process of the operation verification in verification resource pattern 1 (2 CPUs) and 1 hour is required for a process of the operation verification in verification resource pattern 2 (a combination of 2 CPUs and 1 GPU), content indicating selection of verification resource pattern 1 or verification resource pattern 2 in accordance with a resource state of a machine learning execution environment is described.

Subsequently, the verifier 12 registers the machine learning algorithm on which operation verification has been completed in the algorithm storage 52 (step S809). As described above, the process of the present flowchart is completed.

As described above, for example, a situation in which the computation time is recorded in the metadata storage 53 with respect to a case where the model is trained by performing a training process with only the CPU and a case where the model is trained using the CPU and the GPU for a certain verification dataset focusing on the computing resources and the computation time is assumed. Because an AI algorithm such as deep learning is known to be able to reduce processing time by utilizing GPUs, but GPUs are expensive hardware compared to CPUs, GPUs are not necessarily used all the time. A plurality of methods are conceivable as a method in which the learning controller 112 sets resources. For example, a process of computing the usage cost per unit time, computing in which of a case where the model is trained only with the CPU or a case where the model is trained with the CPU and GPU the cost performance is excellent, and performing selection may be performed. Also, when either case is emphasized, for example, when it is possible to finish learning quickly even if it is slightly expensive, a cost function including weighting may be set and the computing resources may be determined on the basis of the output. For example, a cost function J can be defined as the following Eq. (1).

$$J = \text{Number of used CPUs} \times \text{CPU usage time} \times \text{one-used-CPU-specific cost per unit time} + \text{Number of used GPUs} \times \text{GPU usage time} \times \text{one-used-GPU-specific cost per unit time} \quad \text{Eq. (1)}$$

For a plurality of users to perform model training in the machine learning execution environment, the GPU provided in the learning device is likely to be occupied by other users. In this case, a case where it is possible to execute model training with only the CPU as long as the algorithm can also be executed only with the CPU is also conceivable.

Also, when variations can be considered as execution conditions or settings for the machine learning algorithm, operation verification may be performed for a plurality of patterns. When a domain is given as a hyperparameter of a machine learning algorithm, for example, a parameter that determines the model structure of machine learning or a parameter for controlling model training, verification may be performed in a case where the maximum value or the minimum value is selected as the parameter.

That is, the verifier 12 executes a machine learning algorithm with at least one computing resource allocation pattern and the first display controller (the display controller 14) causes feedback information including execution acceptance/rejection, a processing speed, and a memory usage amount to be displayed. Also, the verifier 12 executes a machine learning algorithm in a plurality of computing resource allocation patterns and the controller (the learning controller 112) allocates resources during machine learning execution on the basis of results of operation verification by the verifier 12 in the plurality of computing resource allocation patterns.

According to the automated machine learning system S of the seventh embodiment described above, when a new machine learning algorithm is registered in the automated machine learning system S, it is possible to automatically verify and confirm that the minimum specifications are satisfied. Also, it is possible to automatically verify and manage the execution conditions of new machine learning algorithms that are difficult for the developer to comprehensively ascertain by performing operation verification using a plurality of verification resource patterns. For example, in relation to CPUs and GPUs required as computing resources, the time and effort required for the developer D to perform verification and evaluation in advance and make an adjustment according to the actual situation during execution is reduced.

Eighth Embodiment

Hereinafter, an eighth embodiment will be described. An automated machine learning system S of the eighth embodiment has a configuration similar to that of the automated machine learning system S of the third embodiment. The automated machine learning system S of the eighth embodiment is different from the third embodiment in that a used memory size is measured during operation verification. Hereinafter, the automated machine learning system S of the eighth embodiment will be described, focusing on differences from the third embodiment.

[Operation Verification Process]

Figure 14:
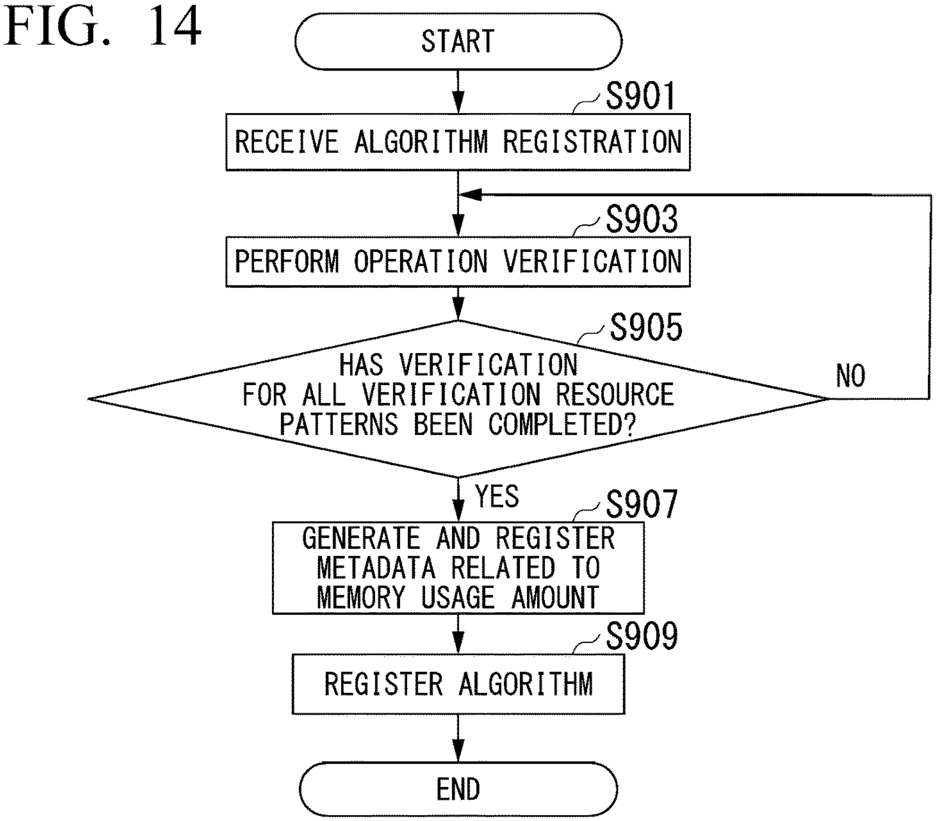
FIG. 14 is a flowchart showing an example of an operation verification process for a machine learning algorithm according to an eighth embodiment.

Hereinafter, a flow of an operation verification process for a machine learning algorithm in a machine learning algorithm integrated management device 1 will be described. FIG. 14 is a flowchart showing an example of the process for the operation verification on the machine learning algorithm according to the eighth embodiment. In addition, an example in which the verification dataset storage 51 includes verification pattern 1 (an image classification dataset, 500 pieces of normal data, and 500 pieces of abnormal data) and verification pattern 2 (an image classification dataset, 500 pieces of normal data, 5,000 pieces of abnormal data) will be described.

First, the registration receiver 11 receives registration of a new machine learning algorithm input by the developer D via the input interface 40 (step S901).

Subsequently, the verifier 12 allocates a sufficient amount of memory (for example, 256 GB) using a verification dataset of any one of a plurality of verification patterns (for example, verification pattern 1) and performs operation verification by executing a machine learning algorithm whose registration has been received by the registration receiver 11 (step S903).

Subsequently, the verifier 12 determines whether or not operation verification for all the plurality of verification patterns has been completed (step S905). When it is determined that operation verification for all the plurality of verification patterns has not been completed (step S905: NO), the verifier 12 performs operation verification by executing a machine learning algorithm whose registration has been received by the registration receiver 11 using any one of the plurality of verification patterns for which operation verification has not been performed among the plurality of verification patterns (step S903) and the subsequent processing is iterated. For example, the verifier 12 performs operation verification using the verification dataset of verification pattern 2.

When it is determined that all operation verification for the plurality of verification patterns has been completed by the verifier 12 (step S905: YES), the metadata register 12-2 generates metadata that defines conditions related to a memory usage amount to be applied during machine learning execution on the basis of results of operation verification in the plurality of verification patterns and registers the metadata in the metadata storage 53 (step S907).

For example, when a maximum memory used in operation verification in verification pattern 1 is 11.2 GB and the maximum used memory in operation verification in verification pattern 2 is 11.3 GB, content indicating a memory of "12 GB" allocated for machine learning is described in the metadata.

Subsequently, the verifier 12 registers the machine learning algorithm on which operation verification has been completed in the algorithm storage 52 (step S909). Thereby, the process of the present flowchart is completed.

As described above, a sufficiently large amount of memory is allocated in the verifier 12, a memory usage amount used when the algorithm is executed is recorded. The trainer 114 of the machine learning device 100 allocates and executes a memory whose memory usage amount is slightly larger than the memory usage amount used in the verification, such that it is possible to prevent an excessive memory from being allocated simultaneously when a memory necessary for execution is allocated and efficiently use a memory in the entire system.

The memory used to execute the algorithm may depend on the size of the dataset. In order to cope with this case, the verifier 12 performs verification for a plurality of datasets of different sizes and records a used memory. The machine learning device 100 may allocate a value larger than the maximum used memory size of the result during model training. Also, an approximate straight line or an approximate curve may be fitted with respect to the size of the dataset and the memory usage amount, such that the memory usage amount can be estimated from the size of the dataset. In this case, a required memory amount is estimated in accordance with the dataset by the user U in the machine learning device 100 and model training is performed by allocating the estimated memory amount.

According to the automated machine learning system S of the eighth embodiment described above, when a new machine learning algorithm is registered in the automated machine learning system S, it is possible to automatically verify and confirm that the minimum specifications are satisfied. Also, it is possible to automatically verify and manage the execution conditions of new machine learning algorithms that are difficult for the developer to comprehensively ascertain by performing operation verification using a plurality of verification patterns. That is, in relation to the memory required as computing resources, the time and effort required for the developer D to perform verification and evaluation in advance and make an adjustment according to the actual situation during execution is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automated machine learning system comprising:
at least one processor programmed to:
receive registration of a machine learning algorithm;
store, in a verification dataset storage, a verification dataset for use in operation verification on the machine learning algorithm;
perform the operation verification by executing the machine learning algorithm using the verification dataset stored in the verification dataset storage;
generate feedback information on the basis of a result of the operation verification;
control display of the generated feedback information; and
store, in an algorithm storage, the machine learning algorithm for which the result of the operation verification satisfies a specific criterion,
wherein
the verification dataset includes at least one standard format dataset and at least one extended format dataset,
if a result of the operation verification using the standard format dataset is accepted and a result of the operation verification using the extended format dataset is rejected, the at least one processor is further programmed to:
estimate a cause of the rejection from a data format difference between the standard format dataset and the extended format dataset, and
generate the feedback information including the estimated cause of the rejection.

2. The automated machine learning system according to claim 1, wherein the at least one processor is further programmed to:
control execution of machine learning;
store, in a training dataset storage, a training dataset for use in the machine learning;
preprocess the training dataset stored in the training dataset storage on the basis of the control;
train a model with respect to the preprocessed training dataset using the machine learning algorithm stored in the algorithm storage on the basis of the control;
store, in an evaluation result storage, a result of evaluating the trained model; and
control display of the evaluation result stored in the evaluation result storage.

3. The automated machine learning system according to claim 2, wherein the at least one processor is further programmed to:
cause a list of machine learning algorithms stored in the algorithm storage to be displayed, and
train the model using the machine learning algorithm designated by a user among the machine learning algorithms included in the displayed list.

4. The automated machine learning system according to claim 2, wherein the at least one processor is further programmed to:
select one or more of machine learning algorithms stored in the algorithm storage on the basis of a machine learning task designated by a user; and
train the model using the selected machine learning algorithm.

5. The automated machine learning system according to claim 2, wherein the at least one processor is further programmed to:
cause an item of a hyperparameter defined in the machine learning algorithm stored in the algorithm storage to be displayed, and
train the model using a value of the hyperparameter designated by a user with respect to the displayed item of the hyperparameter.

6. The automated machine learning system according to claim 2, wherein the at least one processor is further programmed to:
select at least one hyperparameter as a setting of hyperparameter defined in the machine learning algorithm stored in the algorithm storage; and
train the model using the selected setting of hyperparameter.

7. The automated machine learning system according to claim 1, wherein
the standard format dataset is an image dataset unified in a specific file format, resolution, the number of channels, and color depth,
the extended format dataset is an image dataset in which at least one of a file format, resolution, the number of channels, color depth, and the number of images is different or an image dataset having a different number of images, and
the at least one processor is further programmed to estimate a difference between the standard format dataset and the extended format dataset as the cause of the rejection.

8. The automated machine learning system according to claim 1, wherein
the standard format dataset is a tabular dataset including only real-valued variables,
the extended format dataset is a tabular dataset including at least one of a categorical variable, text data, timestamp data, and a missing value or a tabular dataset having a different sample size, and
the at least one processor is further programmed to estimate the difference between the standard format dataset and the extended format dataset as the cause of the rejection.

9. The automated machine learning system according to claim 1, wherein
the verification dataset includes at least one standard format dataset and at least one extended format dataset,
the at least one processor is further programmed to:
execute the machine learning algorithm to perform an accuracy test for model training and estimate a cause of rejection from a data property difference between the standard format dataset and the extended format dataset if a result of the accuracy test using the standard format dataset satisfies an accuracy criterion and a result of the accuracy test using the extended format dataset does not satisfy the accuracy criterion, and
generate the feedback information including the estimated cause of the rejection.

10. The automated machine learning system according to claim 9, wherein
the standard format dataset is an image dataset in which image data including only normalized luminance values is input and values or labels serving as objective variables are unbiased, the extended format dataset includes a deviation value in an input image, includes a biased value or label in the objective variable, or has a different number of images, and the at least one processor is further programmed to estimate the difference between the standard format dataset and the extended format dataset as the cause of the rejection.

11. The automated machine learning system according to claim 9, wherein the standard format dataset is a tabular dataset including only normalized real-valued variables and in which values or labels serving as objective variables are unbiased, the extended format dataset includes a deviation value in an explanatory variable, includes a biased value or label in the objective variable, or has a different sample size, and the at least one processor is further programmed to estimate the difference between the standard format dataset and the extended format dataset as the cause of the rejection.

12. The automated machine learning system according to claim 2, wherein the verification dataset includes at least one standard format dataset and at least one extended format dataset, and the at least one processor is further programmed to:

store an item of the extended format dataset in a metadata storage as preprocessing to be applied in the machine learning if a result of the operation verification using the standard format dataset is accepted and a result of the operation verification using the extended format dataset is rejected; and execute a process of converting the training dataset to be preprocessed into a standard format with reference to the metadata storage.

13. The automated machine learning system according to claim 2, wherein the verification dataset includes at least one standard format dataset and at least one extended format dataset, and the at least one processor is further programmed to:

execute the machine learning algorithm to perform an accuracy test for model training;

store an item of the extended format dataset in a metadata storage as preprocessing to be applied in the machine learning if a result of the accuracy test using the standard format dataset satisfies an accuracy criterion and a result of the accuracy test using the extended format dataset does not satisfy the accuracy criterion; and execute a process of converting dataset to be preprocessed into a standard format with reference to the metadata storage.

14. The automated machine learning system according to claim 1, wherein the at least one processor is further programmed to compare a result of operation verification on the machine learning algorithm with a result of operation verification on another machine learning algorithm of the same type with respect to at least one of accuracy, execution time, and computing resources.

15. The automated machine learning system according to claim 3, wherein the at least one processor is further programmed to:

perform a standardization process of converting an extended format dataset into a format of a standard format dataset; and perform the operation verification using the standardized dataset.

16. The automated machine learning system according to claim 1, wherein the at least one processor is further programmed to:

execute the machine learning algorithm in a pattern for allocating at least one computing resource, and cause the feedback information including execution acceptance/rejection, a processing speed, and a memory usage amount to be displayed.

17. The automated machine learning system according to claim 2, wherein the at least one processor is further programmed to:

execute the machine learning algorithm in a pattern for allocating a plurality of computing resources, and allocate the resources when the machine learning is executed on the basis of an operation verification result of the verifier in the pattern for allocating the plurality of computing resources.

18. An automated machine learning method comprising:

receiving, by a computer, registration of a machine learning algorithm;

performing, by the computer, operation verification by executing the machine learning algorithm using a verification dataset for use in the operation verification on the machine learning algorithm stored in a verification dataset storage;

generating, by the computer, feedback information on the basis of a result of the operation verification;

controlling, by the computer, display of the generated feedback information; and storing, by the computer, the machine learning algorithm for which the result of the operation verification satisfies a specific criterion in an algorithm storage, wherein the verification dataset includes at least one standard format dataset and at least one extended format dataset, in the performing the operation verification, if a result of the operation verification using the standard format dataset is accepted and a result of the operation verification using the extended format dataset is rejected, a cause of the rejection is estimated from a data format difference between the standard format dataset and the extended format dataset, and in the generating the feedback information, the feedback information including the estimated cause of the rejection is generated.

19. A computer-readable non-transitory storage medium storing a program for causing a computer to:

receive registration of a machine learning algorithm;

perform operation verification by executing the machine learning algorithm using a verification dataset for use in the operation verification on the machine learning algorithm stored in a verification dataset storage;

generate feedback information on the basis of a result of the operation verification;

control display of the generated feedback information; and store the machine learning algorithm for which the result of the operation verification satisfies a specific criterion in an algorithm storage, wherein the verification dataset includes at least one standard format dataset and at least one extended format dataset, in performing the operation verification, if a result of the operation verification using the standard format dataset is accepted and a result of the operation verification using the extended format dataset is rejected, a cause of the rejection is estimated from a data format difference between the standard format dataset and the extended format dataset, and in generating the feedback information, the feedback information including the estimated cause of the rejection is generated.

20. The automated machine learning system according to claim 1, wherein the at least one processor comprises first and second processors.

* * * * *